US 9,445,102 B2

(12) United States Patent
Schwaab et al.

(10) Patent No.: US 9,445,102 B2
(45) Date of Patent: Sep. 13, 2016

(54) MODEL PARAMETER ESTIMATION FOR A RATE- OR DISTORTION-QUANTIZATION MODEL FUNCTION

(75) Inventors: Manuel Schwaab, Erlangen (DE); Herbert Thoma, Erlangen (DE)

(73) Assignee: Fraunhofer-Gesellschaft zur Foerderung der angewandten Forschung e.V, Munich (DE)

( * ) Notice: Subject to any disclaimer, the term of this patent is extended or adjusted under 35 U.S.C. 154(b) by 1105 days.

(21) Appl. No.: 13/541,974

(22) Filed: Jul. 5, 2012

(65) Prior Publication Data

US 2013/0010859 A1    Jan. 10, 2013

(30) Foreign Application Priority Data

Jul. 7, 2011   (EP) ..................................... 11173076

(51) Int. Cl.
   *H04N 7/26*       (2006.01)
   *H04N 19/126*     (2014.01)
   (Continued)

(52) U.S. Cl.
   CPC ............ *H04N 19/126* (2014.11); *H04N 19/14* (2014.11); *H04N 19/147* (2014.11); *H04N 19/15* (2014.11); *H04N 19/172* (2014.11); *H04N 19/196* (2014.11); *H04N 19/198* (2014.11)

(58) Field of Classification Search
   CPC .... H04N 19/53; H04N 19/433; H04N 19/56; H04N 19/126; H04N 19/14; H04N 19/147; H04N 19/15; H04N 19/172; H04N 19/196
   USPC ........................... 375/240.26, 240.03, E7.139
   See application file for complete search history.

(56) References Cited

U.S. PATENT DOCUMENTS

| | | | | |
|---|---|---|---|---|
| 6,111,991 | A * | 8/2000 | Ribas-Corbera | H04N 19/176 375/240.04 |
| 2005/0262276 | A1* | 11/2005 | Singh et al. | ..................... 710/22 |

(Continued)

FOREIGN PATENT DOCUMENTS

| | | |
|---|---|---|
| CN | 1816141 A | 8/2006 |
| CN | 101513072 A | 8/2009 |

(Continued)

OTHER PUBLICATIONS

Greg Welch and Gary Bishop "An Introduction to Kalman Filter" University of Carolina at Chapel Hill. Department of Computer science, copyright 2001 (Retrived on line: http://www.cs.unc.edu/~tracker/media/pdf/SIGGRAPH2001_CoursePack_08.pdf).*

(Continued)

Primary Examiner — William C Vaughn, Jr.
Assistant Examiner — Naod Belai
(74) Attorney, Agent, or Firm — Keating & Bennett, LLP

(57) ABSTRACT

A more accurate model parameter estimation is achieved by using a Kalman filter for discretely estimating the model parameters between the consecutive frames of the frame sequence and performing the correction of the time-discrete Kalman filter twice per frame, firstly using a measurement value which depends on a complexity measure of the current frame to achieve a primarily corrected state of the time-discrete Kalman filter, and secondly using a measurement value depending on an actual coding rate or distortion of the video encoder in encoding the current frame using a predetermined quantization which may have been determined by an estimation of the actual rate- or distortion-quantization function according to the primarily corrected state. A rate-quantization model function relates the quantization of the video encoder to the coding rate of the video encoder and is piecewise defined to exhibit quadratic and exponential functions in finer and coarser quantization intervals, respectively.

35 Claims, 9 Drawing Sheets

(51) Int. Cl.
*H04N 19/147* (2014.01)
*H04N 19/172* (2014.01)
*H04N 19/196* (2014.01)
*H04N 19/15* (2014.01)
*H04N 19/14* (2014.01)

(56) References Cited

U.S. PATENT DOCUMENTS

| | | | |
|---|---|---|---|
| 2009/0086816 A1* | 4/2009 | Leontaris | H04N 19/176 375/240.03 |
| 2009/0232225 A1 | 9/2009 | Yang et al. | |

FOREIGN PATENT DOCUMENTS

| | | |
|---|---|---|
| CN | 101523915 A | 9/2009 |
| JP | 2001-526850 A | 12/2001 |
| WO | 98/35500 A1 | 8/1998 |
| WO | 2007/038248 A2 | 4/2007 |

OTHER PUBLICATIONS

Cheng-Liang Chen, Meng-Fen Ho and Chung-Lin Huang, "Adaptive rate control for H.264/AVC using Kalman filter," 2006 IEEE International Symposium on Circuits and Systems, Island of Kos, 2006, pp. 4 pp.-.*
Tomasz Grajek and Marek Domanski, "Single Frame Rate-Quantization model for MPEG-4 AVC/H.264 Video Encoders", Springer Verlag Berlin Heidelberg 2010.*
Official Communication issued in corresponding Chinese Patent Application No. 201210237959.8, mailed on Aug. 1, 2014.
Official Communication issued in corresponding European Patent Application No. 11173076.8, mailed on May 3, 2012.
Berger, "Rate Distortion Theory A Mathematical Basis for Data Compression," Prentice-Hall, Inc., 1971, 31 pages.
Bryson Jr., "Applied Optimal Control Optimization, Estimation and Control," Blaisdell Publishing Company, 1969, 50 pages.
Bryson Jr. et al., "Estimation Using Sampled-Data Containing Sequentially Correlated Noise," Technical Report No. 533, Office of Naval Research, Division of Engineering and Applied Physics Harvard University, Jun. 1967, 20 pages.
Chan et al., "A Rate Control Scheme Using Kalman Filtering for H.263," J. Vis. Commun. Image R., vol. 16, 2005, pp. 734-748.
Chiang et al., "A New Rate Control Scheme Using Quadratic Rate Distortion Model," IEEE Transactions on Circuits and Systems for Video Technology, vol. 7, No. 1, Feb. 1997, pp. 246-250.
Dong et al., "On Model Parameter Estimation for H.264/AVC Rate Control," IEEE International Symposium on Circuits and Systems, 2007, pp. 289-292.
Grajek et al., "New Model of MPEG-4 AVC/H.264 Video Encoders," Proceedings of 2010 IEEE 17th International Conference on Image Processing, Sep. 26-29, 2010, pp. 961-964.
He et al., "p-Domain Bit Allocation and Rate Control for Real Time Video Coding," International Conference on Image Processing, 2001, pp. 546-549.
Kwon et al., "Rate Control for H.264 Video with Enhanced Rate and Distortion Models," IEEE Transactions on Circuits and Systems for Video Technology, vol. 17, No. 5, May 2007, pp. 517-529.
Lee et al., "Scalable Rate Control for MPEG-4 Video," IEEE Transactions on Circuits and Systems for Video Technology, vol. 10, No. 6, Sep. 2000, pp. 878-894.
Li et al., "Adaptive Basic Unit Layer Rate Control for JVT,"Joint Video Team (JVT) of ISO/IEC MPEG & ITU-T VCEG (ISO/IEC JTC1/SC/WG11 and ITU-T SG16 Q.6), 7th Meeting, Mar. 7-14, 2003, pp. 1-28.
Ma et al., "Rate-Distortion Analysis for H.264/AVC Video Coding and its Application to Rate Control," IEEE Transactions on Circuit and Systems for Video Technology, vol. 15, No. 12, Dec. 2005, pp. 1533-1544.
Petovello et al., "Consideration of Time-Correlated Errors in a Kalman Filter Applicable to GNSS," Journal of Geodesy, vol. 83, 2009, pp. 51-56.
Sermadevi et al., "Convex Programming Formulations for Rate Allocation in Video Coding," IEEE Transactions on Circuits and Systems for Video Technology, vol. 16, No. 8, Aug. 2006, pp. 947-959.
Simon et al., "Kalman Filtering with State Equality Constraints," IEEE Transactions on Aerospace and Electronic Systems, vol. 38, No. 1, Jan. 2002, pp. 128-136.
Simon, "Optimal State Estimation Kalman, Hoo, and Nonlinear Approaches," Wiley-Interscience, 2006, 31 pages.
Sivia et al., "Data Analysis a Bayesian Tutorial," Oxford University Press, 2nd Edition, 2006, 31 pages.
Sorenson, "Least-Squares Estimation: from Gauss to Kalman," IEEE Spectrum, vol. 7, 1970, pp. 63-68.
Stengel, "Optimal Control and Estimation," Dover Publications, Inc, 1994, 17 pages.
Takagi et al., "A Study on Rate Distortion Optimization Scheme for JVT Coder," Visual Communication and Image Processing, Proceeding of SPIE, vol. 5150, 2003, pp. 914-923.
Vetro et al., "MPEG-4 Rate Control for Multiple Video Objects," IEEE Transactions on Circuits and Systems for Video Technology, vol. 9, No. 1, Feb. 1999, pp. 186-199.
Webb et al., "A Simple Rate-Distortion Model, Parameter Estimation, and Application to Real-Time Rate Control for DCT-Based Coders," International Conference on Image Processing, vol. 2, 1997, pp. 13-16.
Zhou et al., "New Rate-Distortion Modeling and Efficient Rate Control for H.264/AVC Video Coding," Signal Processing: Image Communication 24, 2009, pp. 345-356.
Grajek et al., "Single Frame Rate-Quantization Model for MPEG-4 AVC/H.264 Video Encoders," Computer Vision and Graphics, Sep. 20, 2010, pp. 384-391.
Wan et al., "Frame-Layer Rate Control for JVT Video Coding Using Improved Quadratic Rate Distortion Model," Visual Communication and Image Processing, Jul. 12, 2005, pp. 1053-1060.
Official Communication issued in corresponding Japanese Patent Application No. 2012-149192, mailed on Jun. 18, 2013.

* cited by examiner

MODEL PARAMETER ESTIMATION FOR A RATE- OR DISTORTION-QUANTIZATION MODEL FUNCTION

CROSS-REFERENCE TO RELATED APPLICATIONS

This application claims priority from European Patent Application No. 11173076.8-2223, which was filed on Jul. 7, 2011, and is incorporated herein in its entirety by reference.

The present invention relates to model parameter estimation for a rate-quantization or distortion-quantization model function so as to approximate an actual rate-quantization or distortion-quantization function of a video encoder for a frame sequence such as, for example, for real-time video encoding.

BACKGROUND OF THE INVENTION

Rate control tasks in video encoding can be greatly enhanced if the rate-quantization characteristic R(QP) of the current frame is known, i.e. which quantizer yields which rate. This obviously holds, for example, for low delay rate control where it is important to match a given target bitrate very closely. However, in real-time applications it is usually not possible to determine R(QP) exactly as this would involve encoding the frame with all possible quantization parameters. Therefore, models were introduced that try to predict the relationship between rate and quantization. That is, the rate-quantization function R(QP) is modeled as $$R(QP) \approx \text{model}(QP, \beta) \qquad (1)$$

where $\beta$ is a vector containing the parameters of the model.

Sufficiently accurate models are already available for the distortion-quantization function (see [21]).

However, the task of modeling the rate-quantization relation is much more difficult.

Several different models aiming to represent the R-Q characteristic of H.264/AVC coded video frames have emerged in the literature. The most popular one (e.g. used in [11]) is the quadratic model proposed by [5]. It has two adjustable parameters and often uses MAD (mean absolute difference) to predict the new frame complexity [22]. It is defined as $$R(QP) \approx \beta_1 \frac{MAD}{Q_{Step}(QP)} + \beta_2 \frac{MAD}{Q_{Step}(QP)^2} \qquad (2)$$

where the relation between quantization parameter and quantization step size ($Q_{Step}$) is defined in the H.264/AVC standard [14]. Some further proposals of different complexity are the linear model [12], the exponential model in [24], the $\rho$—domain model based on the number of non zero coefficients [8] or a piecewise defined model given by [7].

Even more essential than the potential accuracy of the R-Q model is the reliable estimation of its parameters [6]. Besides the use of statistical measures (like e.g. the previously mentioned MAD) the parameters of these models are usually determined by means of linear regression e.g. [5] [10]. Furthermore there are a few approaches using the Kalman filter e.g. [23], [4].

However all of the models mentioned previously have shortcomings concerning model accuracy, complexity, smoothness or convexity. Similarly none of the published algorithms used to determine the model parameters provides a sufficiently accurate and straightforward estimation.

SUMMARY

According to an embodiment, an apparatus for estimating model parameters of a rate- or distortion-quantization model function so as to approximate an actual rate- or distortion-quantization function of a video encoder for a frame sequence may have: an updater configured to perform a prediction of a time-discrete Kalman filter, a state of which defines a parameter estimate for the model parameters to achieve a predicted state of the time-discrete Kalman filter for a current frame of the frame sequence from a state of the time-discrete Kalman filter for a previous frame of the frame sequence; a first corrector configured to determine a complexity measure of the current frame k, and perform a correction of the time-discrete Kalman filter using a measurement value which depends on the complexity measure determined so as to achieve a primarily corrected state of the time-discrete Kalman filter from the predicted state; and a second corrector configured to perform a correction of the time-discrete Kalman filter using a measurement value which depends on an actual coding rate or distortion of the video encoder in encoding the current frame using a predetermined quantization.

According to another embodiment, a system may have: a video encoder; and an apparatus for estimating model parameters of a rate- or distortion-quantization model function so as to approximate an actual rate- or distortion-quantization function of the video encoder for a frame sequence, which apparatus may have: an updater configured to perform a prediction of a time-discrete Kalman filter, a state of which defines a parameter estimate for the model parameters to achieve a predicted state of the time-discrete Kalman filter for a current frame of the frame sequence from a state of the time-discrete Kalman filter for a previous frame of the frame sequence; a first corrector configured to determine a complexity measure of the current frame k, and perform a correction of the time-discrete Kalman filter using a measurement value which depends on the complexity measure determined so as to achieve a primarily corrected state of the time-discrete Kalman filter from the predicted state; and a second corrector configured to perform a correction of the time-discrete Kalman filter using a measurement value which depends on an actual coding rate or distortion of the video encoder in encoding the current frame using a predetermined quantization.

Another embodiment may have an apparatus for estimating model parameters of a rate-quantization model function so as to approximate an actual rate-quantization function of a video encoder for a frame sequence, wherein the apparatus is configured such that the rate-quantization model function is a piecewise function having a quadratic function piece within a finer quantization interval, and an exponential function piece within a coarser quantization interval.

According to another embodiment, a method for estimating model parameters of a rate- or distortion-quantization model function so as to approximate an actual rate- or distortion-quantization function of a video encoder for a frame sequence may have the steps of: performing a prediction of a time-discrete Kalman filter, a state of which defines a parameter estimate for the model parameters to achieve a predicted state of the time-discrete Kalman filter for a current frame of the frame sequence from a state of the time-discrete Kalman filter for a previous frame of the frame sequence; determining a complexity measure of the current frame k, and performing a correction of the time-discrete Kalman filter using a measurement value which depends on the complexity measure determined so as to achieve a primarily corrected state of the time-discrete Kalman filter from the predicted state; and performing a correction of the time-discrete Kalman filter using a measurement value which depends on an actual coding rate or distortion of the video encoder in encoding the current frame using a predetermined quantization, and using a measurement matrix which depends on a linearized version of a relation between the model parameters and the coding rate or distortion in accordance with the rate- or distortion-quantization model function for the predetermined quantization, linearized at the primarily corrected state.

Another embodiment may have a method for estimating model parameters of a rate-quantization model function so as to approximate an actual rate-quantization function of a video encoder for a frame sequence, wherein the rate-quantization model function is a piecewise function having a quadratic function piece within a finer quantization interval, and an exponential function piece within a coarser quantization interval.

Another embodiment may have a computer program having a program code for performing, when running on a computer, a method for estimating model parameters of a rate- or distortion-quantization model function so as to approximate an actual rate- or distortion-quantization function of a video encoder for a frame sequence, which method may have the steps of: performing a prediction of a time-discrete Kalman filter, a state of which defines a parameter estimate for the model parameters to achieve a predicted state of the time-discrete Kalman filter for a current frame of the frame sequence from a state of the time-discrete Kalman filter for a previous frame of the frame sequence; determining a complexity measure of the current frame k, and performing a correction of the time-discrete Kalman filter using a measurement value which depends on the complexity measure determined so as to achieve a primarily corrected state of the time-discrete Kalman filter from the predicted state; and performing a correction of the time-discrete Kalman filter using a measurement value which depends on an actual coding rate or distortion of the video encoder in encoding the current frame using a predetermined quantization, and using a measurement matrix which depends on a linearized version of a relation between the model parameters and the coding rate or distortion in accordance with the rate- or distortion-quantization model function for the predetermined quantization, linearized at the primarily corrected state.

Another embodiment may have a computer program having a program code for performing, when running on a computer, a method for estimating model parameters of a rate-quantization model function so as to approximate an actual rate-quantization function of a video encoder for a frame sequence, wherein the rate-quantization model function is a piecewise function having a quadratic function piece within a finer quantization interval, and an exponential function piece within a coarser quantization interval.

In accordance with a first aspect, the present invention is based on the finding that a more accurate model parameter estimation may be achieved if a Kalman filter is used for discretely estimating the model parameters between the consecutive frames of the frame sequence and if the correction step of the time-discrete Kalman filter is performed twice per frame, namely first using a measurement value which depends on a complexity measure (one or more) of the current frame so as to obtain a primarily corrected state of the time-discrete Kalman filter, and secondly using a measurement value which depends on an actual coding rate or distortion of the video encoder in encoding the current frame using a predetermined quantization which, in turn, may have been determined by use of an estimation of the actual rate- or distortion-quantization function according to the primarily corrected state.

In accordance with another aspect of the present invention, the present invention is based on the finding that a better compromise between a to complicated rate-quantization model function on the one, which leads to unstable model parameter estimations, and a too simple rate-quantization model function, which leads to a stable but inaccurate rate-quantization function approximation, is achieved if a rate-quantization model function is used which relates the quantization of the video encoder to the coding rate of the video encoder and is piecewise defined so as to exhibit a quadratic function in a finer quantization interval, and an exponential function in a coarser quantization interval.

The ideas and advantages of the two aspects may be exploited individually. Alternatively, embodiments of the present invention take advantage of both aspects.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
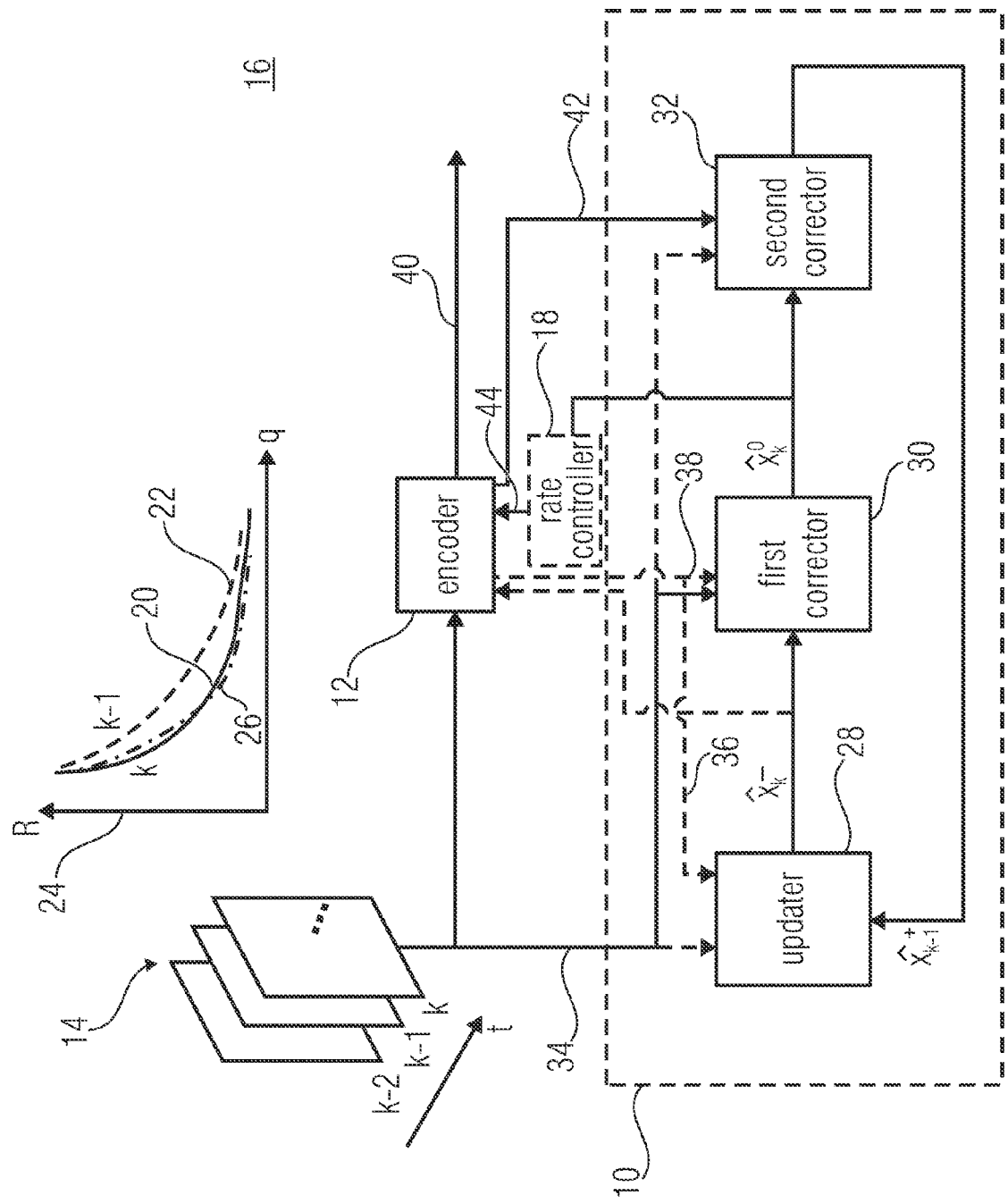
FIG. 1 shows a block diagram of an apparatus for estimating model parameters of a rate-quantization model function so as to approximate an actual rate-quantization function of a video encoder for a frame sequence and a possible integration thereof into a system along with a video encoder according to an embodiment.

FIG. 1 shows an apparatus 10 for estimating model parameters of a rate-quantization model function so as to approximate an actual rate-quantization function of a video encoder 12 for a frame sequence 14. Together, encoder 12 and apparatus 10 form a system for encoding the frame sequence 14. Optionally, the system 16 may also comprise a rate controller 18, the function of which will be outlined in more detail below.

The frame sequence 14 may be any video or any other spatio-temporal sampling of a scene. The sample values of the frames of the frame sequence 14 may be luminance or luma values, color values, depth values or the like, or even a combination thereof.

The video encoder 12 may be of any type, such as a temporally predictive coder using, for example, motion-compensated prediction with choosing motion parameters on a frame block basis. In particular, video encoder 12 may be a hybrid encoder deciding on a block-by-block basis, as to whether blocks into which the frames of the frame sequence 14 are subdivided, are to be predicted using temporal prediction based on previously encoded frames and/or spatial prediction based on previously encoded neighboring blocks of the current frame. In accordance with a more detailed description of an embodiment outlined below, the encoder 12 is, for example, a video encoder configured to generate a H.264 compliant data stream. However, encoder 12 may alternatively operate in accordance with the JPEG 2000 standard or in accordance with the upcoming H.265 video standard.

The video encoder 12 has a certain characteristic in encoding frame sequences such as frame sequence 14. Owing to the prescription of the data stream which the video encoder 12 has to obey in encoding the inbound frame sequences, video encoder 12 exhibits a characteristic relation between the quantization used by the video encoder 12 to encode the frame sequence 14 and the coding rate, i.e. number of bits needed for encoding, with this characteristic curve in turn depending on the complexity of the frame sequence itself. To be more precise, the video encoder 12 is configured to encode the frame sequence 14 in a lossy manner by use of quantization such as quantizing sample values and/or transform coefficients, such as sample values and/or transform coefficients representing the frames to be encoded, or the prediction residual thereof. Naturally, the coding quality decreases when increasing the quantization amount, i.e. the coarser the quantization is the lower the coding quality is. However, on the other hand, video encoder 12 is able to achieve the decreased coding quality at coarser quantizations using lower coding rates, and accordingly an actual rate-quantization function R(q), which relates the coding rate R to the quantization q and vice versa, is usually a monotonically decreasing function of the quantization q. However, as already mentioned above, this relation also depends on the complexity of the material to be encoded. It goes without saying that the complexity of the frames within a frame sequence tend to be non-constant. Accordingly, the rate-quantization function of encoder 12 for frame sequence 14 is also subject to time variation. For illustration purposes, FIG. 1 shows an exemplary rate-quantization function of encoder 12 for frame k of frame sequence 14 at reference sign 20, i.e. $R_k(q)$, along with the rate-quantization function $R_{k-1}(q)$ for the previous frame k−1 at reference sign 22 in a common diagram 24, the horizontal axis of which spans the quantization q and the vertical axis of which spans the coding rate R. As a minor note, it is mentioned that the quantization q could be any measure for the amount of quantization used by encoder 12. Accordingly, q=0 could either mean that encoder 12 does not use any quantization or a some minimum quantization such as operating on bit level. Moreover, although FIG. 1 suggests that encoder 12 would be able to continuously change the quantization q, it could be possible that the encoder 12 merely allows for a discrete setting of the quantization q. The same applies with respect to the coding rate R. Any measure could be used in order to measure the coding rate R, such as the number of bits used to encode the respective frame.

Due to the dependency of the rate-quantization function 20 on the content of the frame sequence 14, the rate-quantization function 20 is not known a priori. Of course, encoder 12 could perform many trials in setting the coding options available, including the amount of quantization, in order to sample the rate-quantization function 20 for each frame of the frame sequence 14 in order to finally select an optimum amount of quantization based on the thus sampled R-Q curve, but this would be a cumbersome task for encoder 12 and depending on the application there is not enough time to do so for the encoder 12. This is true, for example, in case of real time applications where the encoder 12 is for encoding the frame sequence 14 in real time, such as in camcorders or the like. In such a case it is advantageous to be able to forecast the rate-quantization function of encoder 12 for the current frame in order to minimize the number of trials, or to even streamline the encoding of the current frame by encoder 12 to the extent that encoder 12 adopts the optimum quantization as determined, for example, by rate controller 18 based on the estimated rate-quantization function. For example, rate controller 18 has to guarantee that the data stream generated by encoder 12 obeys some rate constraints imposed onto system 16 due to, for example, some transmission capacity via which the data stream has to be transmitted such as the storing rate of some non-volatile memory or the transmission of a wireless or wire communication path via which the data stream is to be transmitted. The better the estimation of the rate-quantization function 20 is, the higher the probability is that the quantization obeying the prescribed coding rate in accordance with the estimated rate-quantization function actually leads to a data stream having an actual coding rate which obeys the coding rate constraints.

As already described above, it is the task of apparatus 10 to estimate model parameters of a rate-quantization model function such that the same approximates the actual rate-quantization function 20 of video encoder 12 as close as possible. That is, the approximation performed by apparatus 10 is restricted by the parameterizable states of the rate-quantization model function underlying apparatus 10. In the more detailed embodiments described below, this rate-quantization model function is a piecewise function comprising a quadratic function portion/piece within a finer quantization interval, and an exponential function portion/piece within a coarser quantization interval and with a manifold of the model parameters having five dimensions, i.e. five independently selectable model parameters. However, the embodiment of FIG. 1 is not restricted to any rate-quantization model function and could be used in connection with other rate-quantization model functions as well. Generally speaking, the rate-quantization model function used by apparatus 10 is a model for approximating the actual rate-quantization function 20, i.e. $R(q) \approx f(q, X)$, with X denoting the model parameters of the rate-quantization model function $f$. Advantageously, a bijective function maps the model parameters X onto the set of possible/available rate-quantization model function instantiations and vice versa. For illustration purposes, FIG. 1 shows such a rate-quantization model function 26 of certain model parameters for approximating the actual rate-quantization function 20 of the current frame k. The way apparatus 10 determines or estimates the corresponding model parameters is outlined below.

Apparatus 10 comprises an updater 28, a first corrector 30 and a second correction 32. As will be outlined in more detail below, updater 28, first corrector 30 and second correction 32 together form an extended time-discrete Kalman filter and are sequentially connected, to this end, into a loop.

Apparatus 10 has an input 34 for receiving the frame sequence 14. As can be seen from FIG. 1, first corrector 30 has an input connected to this input 34. Updater 28 and second corrector 32 may, optionally, have input thereof also connected to input 34. Further, apparatus 10 is interactively connected to encoder 12 either directly or via optional rate controller 18 so as to provide the encoder 12 or rate controller 18 with an estimate of the model parameters and receive from encoder 12 an actual coding rate as obtained by actually encoding a current frame, as will be outlined in more detail below.

In particular, updater 28 is configured to perform a prediction step of the time-discrete Kalman filter, the internal state of which defines a parameter estimate for the model parameters to obtain a predicted state $\hat{x}_k^-$ of the time-discrete Kalman filter for the current frame k of the frame sequence 14 from a state $\hat{x}_{k-1}^+$ of the time-discrete Kalman filter for the previous frame k−1 of the frame sequence 14. That is, updater 28 performs the first step in connection with the iteration step of the time-discrete Kalman filter concerning the current frame k and receives, to this end, the final state at the end of the preceding iteration regarding the previous frame k−1, namely $\hat{x}_{k-1}^+$.

As will be outlined in more detail below, the updater 28 may be configured to, in performing the prediction step of the time-discrete Kalman filter, use an identity matrix as the state transition matrix so that the predicted state $\hat{x}_k^-$ adopts the parameter estimate defined by the final state $\hat{x}_{k-1}^+$ of the previous frame k−1. concurrently, updater 28 increases the uncertainty of the predicted state relative to the final state. As a measure for the uncertainty, a covariance matrix may be used. In particular, the updater 28 may be configured to determine a similarity measure between the current frame k and the previous frame k−1 and increase the uncertainty of the predicted state $\hat{x}_k^-$ by an amount which depends on the similarity measure. In case of an abrupt scene change between the consecutive frames k−1 and k, for example, these frames will have approximately no similarity and the amount of uncertainty increase by predicting the current Kalman state $\hat{x}_k^-$ from the previous state $\hat{x}_{k-1}^+$ will be maximally high. In contrast, in case of a static scene, it is very likely that the uncertainty increase by the prediction by updater 28 will be close to zero. Updater 28 may use any descriptive statistic measure in order to measure the similarity between consecutive frames. The similarity measure may be determined between the current frame k and the previous frame k−1 such that the motion between these frames increases the similarity measure, and/or with eliminating/disregarding the motion between these frames. For example, updater 28 could use a predicted frame predicted from the previous frame k−1 in order to determine the similarity between the current frame k and the predicted frame. The predicted frame could stem from encoder 12 as is illustrated by dashed arrow 36 in FIG. 1. Encoder 12 may have determined the predicted frame by use of motion-compensated prediction, but, for example, at a motion resolution lower than the motion resolution finally used in order to encode the current frame. That is, the motion vectors underlying this predicted frame may have been determined by encoder 12 in a resolution lower than the motion vectors finally used in order to encode the current frame k and being introduced into the data stream as side information along with a quantized prediction residual. Alternatively, another frame of sequence 14 than frame k−1 may serve as reference frame wherein frames close to frame k in presentation time t are advantageous. Additionally, the similarity between frame k and frame k−1 without motion compensation therebetween may be used for obtaining the similarity measure.

As is known for the time-discrete Kalman filter, each iteration step has a correction step following the prediction step as performed by updater 28. In case of apparatus 10, this correction step is performed twice per iteration. The first corrector 30 is for performing the correction step the first time during the iteration concerning the current frame k. In particular, the first corrector 30 is configured to determine a complexity measure of the current frame and perform the correction step of the time-discrete Kalman filter using a measurement value which depends on the complexity measure determined so as to obtain a primarily corrected state $\hat{x}_k^0$ of the time-discrete Kalman filter from the predicted state $\hat{x}_k^-$. The first corrector 30 may be configured to, in determining the complexity measure, determine a measure for a deviation between a provisionally predicted frame determined by motion-compensated prediction and the current frame and/or a measure for a dispersion of a spread of sample values of the current frame around a central tendency thereof. Accordingly, as illustrated by dashed arrow 38, first corrector 30 may receive the provisionally predicted frame from video encoder 12. In fact, this provisionally predicted frame may be the same as optionally received by updater 28 according to 36. Examples for the respective measures mentioned will be outlined in more detail below. In principle, the measure for the deviation may be the range, the mean deviation, the variance or the like. The same applies to the measure of dispersion with respect to the current frame. All of these statistical measures may be determined locally such as on a block-by-block basis with taking the average or some other measure of the central tendency as the final hint for the complexity measure of interest.

To be slightly more precise, the first corrector 30 is configured to try to coarsely predict model parameters for the rate-quantization model function 26 so as to approximate the actual rate-quantization function 20 as close as possible, based on the complexity measure only, i.e. without using any of the preceding states of the time-discrete Kalman filter, that is, also independent on the current state $\hat{x}_k^-$. Of course, this prediction is very coarse, but first corrector 30 may perform the correction step of the time-discrete Kalman filter using a measurement value equal to a difference between the thus coarsely predicted model parameters and a result of a prediction of the model parameters as obtained by first corrector 30 for the previous frame k−1 based on a complexity measure determined for this previous frame k−1, applied to a correlation matrix. In other words, in a previous iteration step, first corrector 30 has already performed the coarse prediction of the model parameters of the rate-quantization model function for the previous frame k−1 based on a respective complexity measure determined for this previous frame k−1. In order to obtain the measurement value for the correction step, the first corrector 30 may apply these coarsely predicted model parameters of the previous frame k−1 to a correlation matrix and determine a difference between the result of this application and the coarsely predicted model parameters of the current frame k. By this measure, the first corrector 30 takes into account the sequential correlation of the noise of the coarse predictions so as to obtain a better measurement value. Accordingly, the first corrector 30 may use a measurement matrix equal to the identity matrix minus the used correlation matrix. The correlation matrix may be an identity matrix times a scalar $\psi_k$ and the first corrector 30 may be configured to set the scalar depending on a similarity between the current frame k and the previous frame k−1. First corrector 30 may determine the similarity in line with updater 28 as mentioned before with respect to arrow 36.

Finally, the second corrector 32 is configured to perform the correction step of the time-discrete Kalman filter a second time using a measurement value which depends on the actual coding rate of the video encoder 12 in encoding the current frame k using a predetermined quantization. In other words, second corrector 32 performs the correction another time on the primarily corrected state $\hat{x}_k^0$ as output by first corrector 30. In order to obtain the actual coding rate needed by video encoder 12 in order to encode the current frame k into the data stream as output by encoder 12 at output 40, second corrector 32 may inspect the data stream itself or alternatively, receive the actual coding rate from video encoder 12 separately as illustrated in FIG. 1 by arrow 42. The predetermined quantization which the video encoder 12 used in order to encode the current frame k at the actual coding rate 42 may have been determined using the rate-quantization model function as defined by the model parameters of the primarily corrected state $\hat{x}_k^0$. Video encoder 12 may perform the determination of the predetermined quantization itself. Alternatively, optional rate controller 18 determines the predetermined quantization and controls the video encoder 12 externally by use of the thus determined predetermined quantization 44. For example, the rate controller 18 may have to obey some coding rate constraints and seeks to find an optimum predetermined quantization 44 based on the rate-quantization model function as determined by the model parameters of the primarily corrected state $\hat{x}_k^0$. The optimum may be defined by minimizing the coding rate or some cost function depending on both coding rate and coding quality. The second corrector 32 performs the correction step of the time-discrete Kalman filter using the measurement value depending on the actual coding rate 42, and a measurement matrix which depends on a linearized version of a relation between the model parameters X and a coding rate of the video encoder 12 in accordance with the rate-quantization model function for the predetermined quantization 44, linearized at the primarily corrected state $\hat{x}_k^0$. In even other words, the second corrector 32 linearizes $f(q, X)$ at the predetermined quantization used by encoder 12 in encoding the current frame at the actual coding rate 42 and the model parameters $\hat{x}_k^0$, and this linearized relation is used by the second corrector 32 as the measurement matrix in the correction step of the time-discrete Kalman filter. The result of this second correction step performed by second corrector 32 represents a twice-corrected state of the time-discrete Kalman filter and thus represents an even better estimation of the model parameters for a better approximation of the actual rate-quantization function 20 of the current frame: The second corrector 32 passes on this twice-corrected state as the reference state for the performance of the prediction step with regard to the next frame k+1 by updater 28.

After having described the embodiment of FIG. 1 rather coarsely, in the following a possible implementation of the embodiment of FIG. 1 is described in more detail by use of an explicit example for the rate-quantization model function. It goes without saying that the details outlined below are readily transferable to other rate-quantization model functions as well and that, accordingly, the details outlined below shall also represent a detailed implementation of the embodiment described above as far as other rate-quantization model functions are concerned. Similarly, the discussion outlined below often assumes the video encoder 12 to be a H.264 encoder. However, the discussion outlined below is not restricted to that type of encoder and in fact, it is readily derivable from the discussion below that all of the details are readily transferable to other video encoders as well.

However, in order to ease the mathematical description of the details outlined below, first, the specific embodiment for the R-Q model is introduced and it is shown how the model parameters of this R-Q model can be interpreted as the state of a dynamic system, i.e. the dynamic system which the time-discrete Kalman filter operates on. Thereafter, Kalman filter basics are presented. After that, the information available to determine the R-Q model is described in a following section. In section IV, it is explained how this information is processed by the modified Kalman filter in order to get an accurate estimate of the model parameters. Some noteworthy remarks are then presented in section V. In section VI, results demonstrating the quality of the presented model in combination with the estimation algorithm are provided. Interspersed within this detailed description, reference is made to FIG. 1 in order to associate the details presented above as possible implementation details for the entities shown in FIG. 1 and described so far. It should be noted that the details presented below pertain to the elements in FIG. 1 individually.

I. R-Q Model

Usually it is not possible to encode a frame with all possible quantization parameter to get the actual R-Q function. Instead models are used to provide an approximate knowledge of the relation between quantization parameter and bitrate to the rate control.

Due to the temporal prediction in motion compensated video coding, the rate-quantization characteristic of a frame strongly depends on the quantization parameters used for the reference frames. However, this would make it much more difficult to find an appropriate model, as the R-Q curve would be even more variable. To avoid this complexity it is assumed that the model is valid for a constant quantizer. That means $R_k(QP)$ is the rate for frame k quantized with QP given that the reference frames were coded with the same quantization parameter QP.

Many models separate between texture/source bits and header bits (see e.g. [9]). The texture bits are the bits used to model the actual picture data. The header bits provide the useful side information like motion vectors, prediction modes and quantization parameters. However it is usually not necessary to have this distinction nor does it simplify the modeling problem. Therefore, the rate-quantization model presented now considers the total rate (texture bits+header bits).

In H.264/AVC the selectable quantization parameters depend on the chosen bit depth. The model now presented in the following is able to approximate R-Q function for all possible bit depths. Therefore, the quantization parameter QP is defined as $$QP \in \{-BDO, \ldots, 51\} \quad (3)$$

where the bit-depth offset (BDO) is defined as BDO=6·(bit_depth_luma−8).

A. R-Q Model Function

The rate-quantization curve R(QP) of an H.264/AVC encoded video frame can look quite different for different frames. This is especially true for higher bit depths and higher quantization step sizes. To be able to approximate all these curves well enough, the often used quadratic function (Eq. (2)) is not sufficient. Therefore, more complex models like in [7] were proposed.

Figure 2:
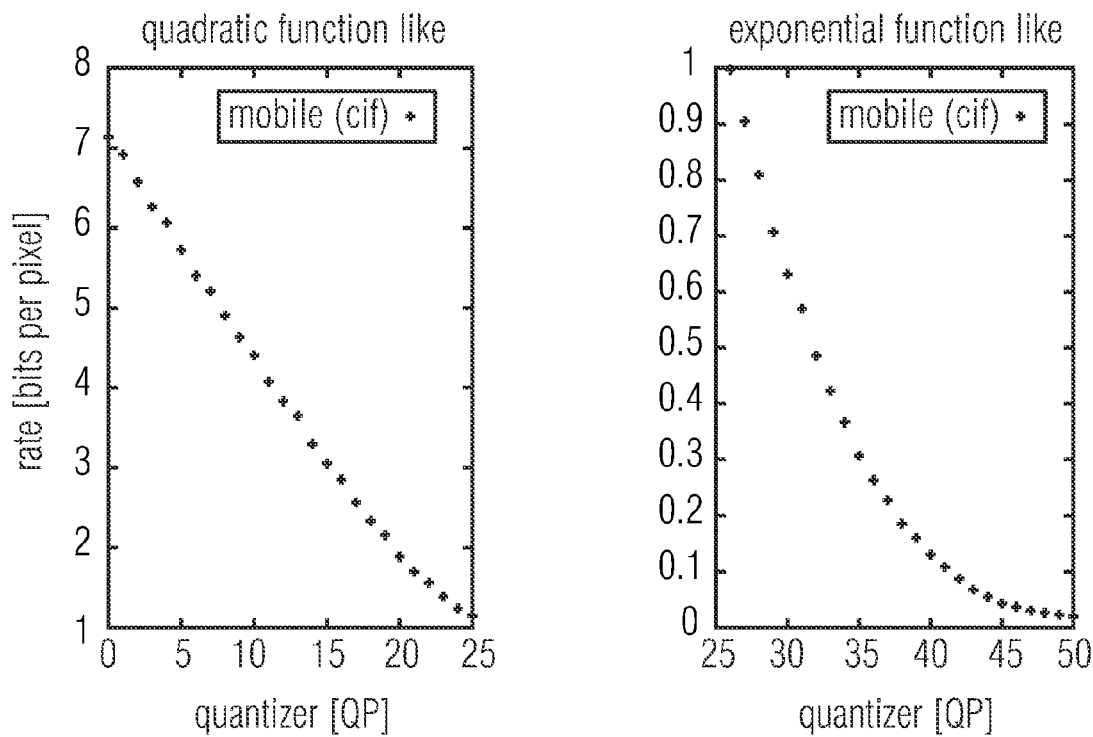
FIG. 2 shows a shape of the rate-quantization curve for one frame of the mobile sequence.

The model derived here is based on the observation that the R(QP)-curves resemble a linear or quadratic function at low quantization parameters. At higher QP values in contrast they usually have an exponential shape. This is visualized in FIG. 2.

Accordingly, the following, heuristically determined, piecewise function may be used as the model function 26 in FIG. 1:

$$f(q, \beta) = \begin{cases} f_1(q, \beta), & 0 \leq q \leq m \\ f_2(q, \beta), & m \leq q \leq N \end{cases} \quad (4)$$

where the first interval is covered by the quadratic function $$f_1(q,\beta) = a_1 + b_1(q-m) + c_1(q-m)^2 \quad (5)$$

and the second interval is modeled by the exponential function $$f_2(q,\beta) = \exp(a_2 + b_2(q-m) + c_2(q-m)^2) \quad (6)$$

The parameter vector $\beta$ is defined as $\beta=[a_1,b_1,c_1,m,a_2,b_2,c_2]$ and N=51+BDO. The relation between the actual quantization parameter QP and the model parameter q which is introduced for notational simplicity is:

$$q = QP + BDO \quad (7)$$

That means q represents just the actual quantization parameter QP shifted by BDO.

Note that the model $f(q,\beta)$ represents the rate in bits per pixel. To get the actual number of bits expected, $f(q,\beta)$ simply has to be multiplied with the number of pixels (NP) within the frame or slice. Accordingly the R-Q function is modeled as $$R(QP) \beta NP \cdot f(q,\beta) = NP \cdot f(QP+BDO,\beta) \quad (8)$$

Figure 3:
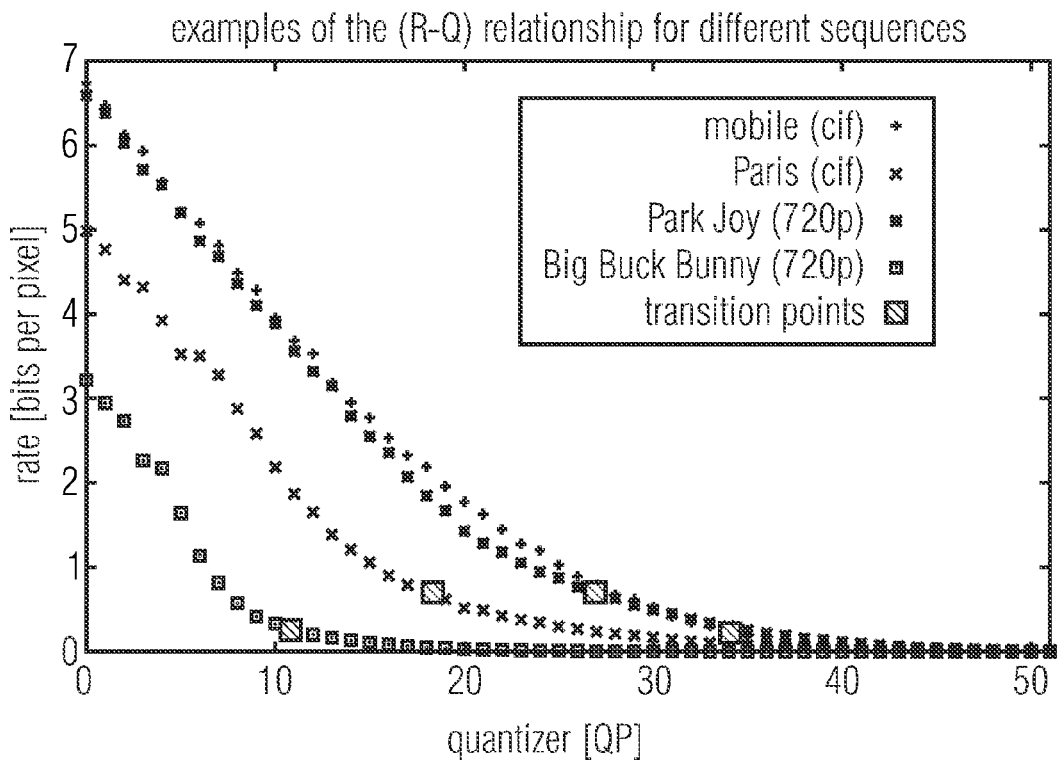
FIG. 3 shows the rate-quantization curve of video frames coded with H.264/AVC in order to illustrate that same can be quite different for different sequences so that the model chosen should be quite adaptable.

The parameters $a_1,b_1,c_1,a_2,b_2,c_2$ and m are used to fit the function to the rate-quantization curve. Note that the location m (quantization parameter) where the first interval ends and the second begins is itself adjustable. This is advantageous as the location of the transition point between the quadratic and exponential model can be quite different for different sequences as demonstrated in FIG. 3 (The transition points were determined using the curve fitting in (10)).

Since $f(q,\beta)$ should be smooth it is to be continuously differentiable. Therefore only such values for $\beta$ are allowed for which $$f_1(m,\beta) = f_2(m,\beta) \text{ and } f_1'(m,\beta) = f_2'(m,\beta) \quad (9)$$

hold. According to this $a_1 = \exp(a_2)$ and $b_1 = b_2 \cdot a_1$, which means that there are actually only 5 freely selectable parameters which can be used to fit the function given by equation (4) to the actual rate-quantization curve of the frame.

Figure 4:
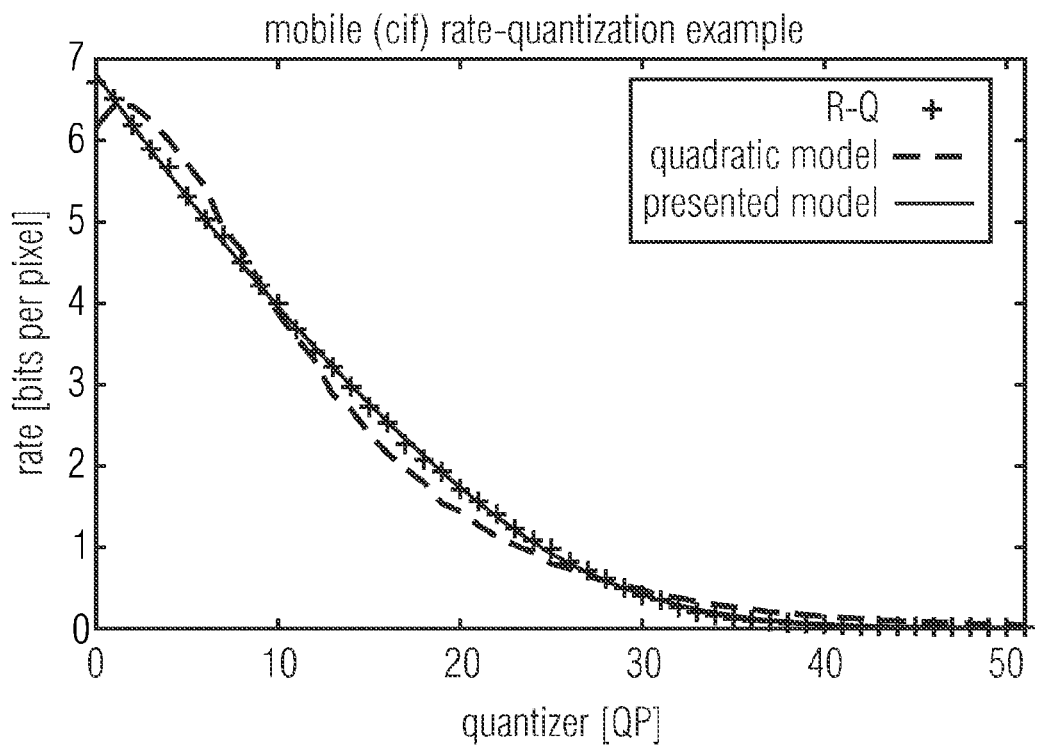
FIG. 4 shows a comparison of the approximation quality of the quadratic and the piecewise defined rate-quantization model according to an embodiment.
Figure 5:
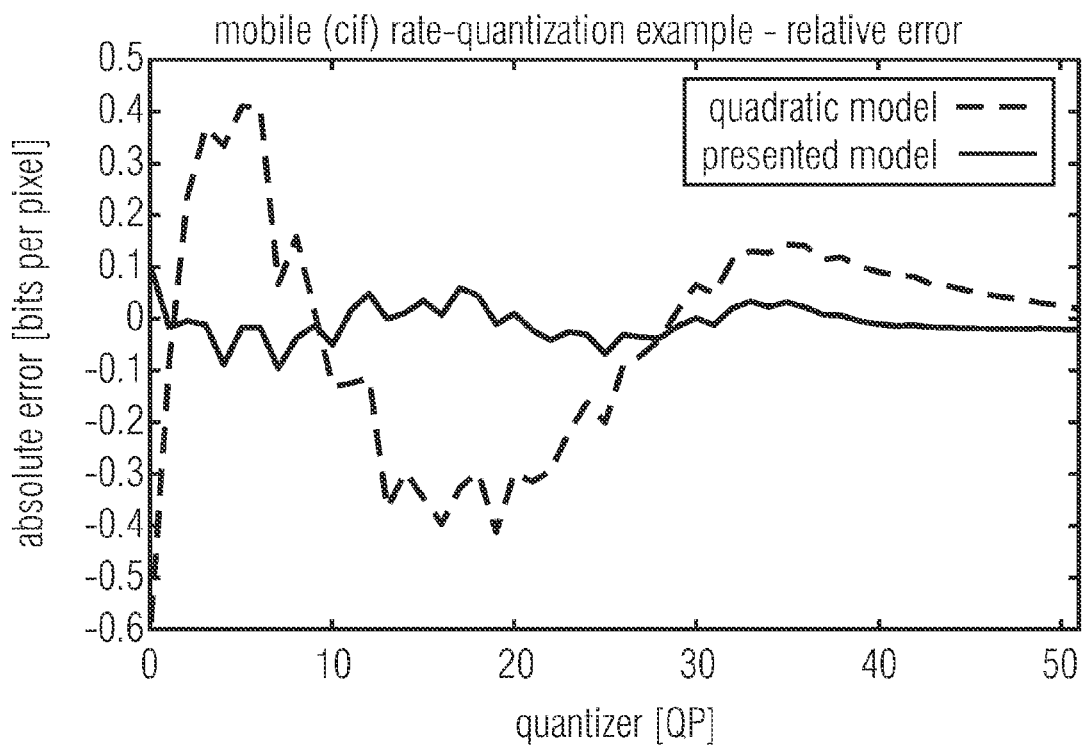
FIG. 5 shows the absolute approximation error of the quadratic and the piecewise defined rate-quantization model according to an embodiment.

The approximation quality of the quadratic model is compared with the just presented model for an exemplary R-Q curve of a frame of the mobile sequence in FIG. 4. Note that the parameters of the quadratic model and the just presented model were determined by using the least squares method. It can be seen that the just presented model is able to approximate the rate-quantization relationship very well. Although not perfect, the quadratic model also seems to be reasonable. However, as we may be seen in FIG. 5, the corresponding absolute error is considerably large. The potential accuracy of the just presented model has the drawback that it is rather complex. This means also that it is more difficult to reliably estimate its parameters. Indeed, the parameters of simple models can be predicted fast and reliably [6]. However, the model should be valid for the whole quantizer range. And as we will show in the next sections it is still possible to estimate the parameters with high quality. Furthermore, as such a model usually only makes sense on the frame (and maybe slice) layer, the additional computations that may be used are insignificant.

B. Approximation

The model function given by (4) shall approximate the actual R(QP) relationship properly. In order to have an appropriate model for the entire QP range, the inventors found that it is more important to have a small relative rather than a small absolute approximation error. By first doing a log transformation and then using the method of least squares acceptable relative errors have been achieved. Accordingly, the optimal parameter vector $\hat{\beta}$ is defined as:

$$\hat{\beta} = \operatorname*{argmin}_{\beta} \sum_{q=0}^{N} (\log(f(q, \beta)) - \log(R(QP)/NP))^2 \quad (10)$$

where it is assumed that only valid vectors according to (9) are considered. A logarithmic transform is applied to take into account that the relative error is more important.

Figure 6:
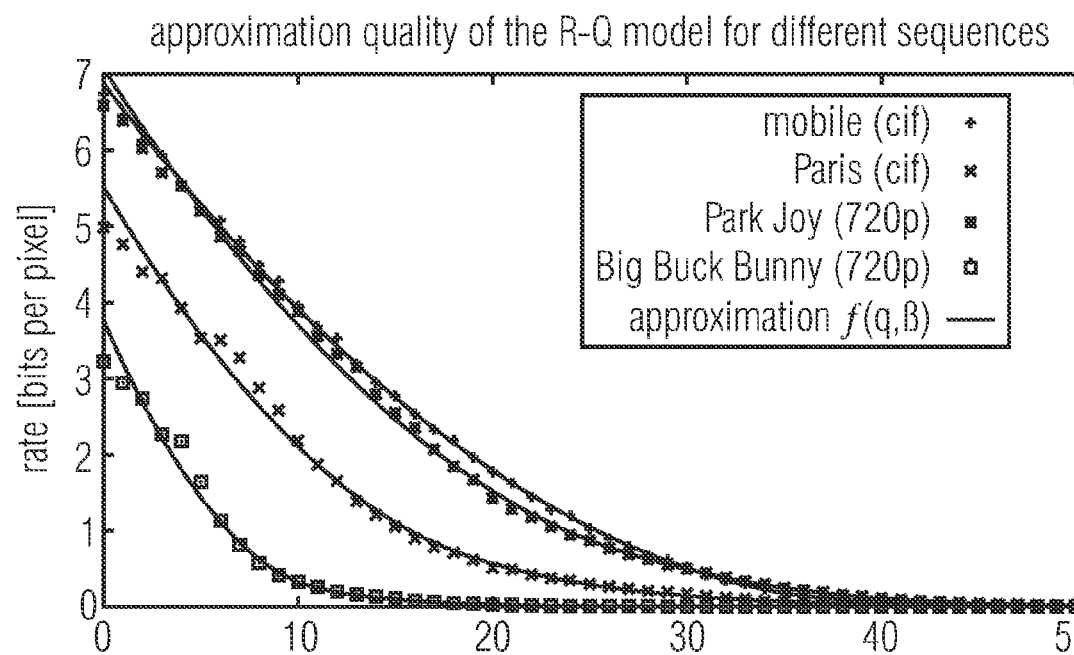
FIG. 6 shows the approximation of the R-Q relationship of frames of different sequences using the piecewise defined rate-quantization model and approximation technique according to an embodiment, wherein the corresponding relative approximation error is depicted in the bottom figure.
Figure 6:
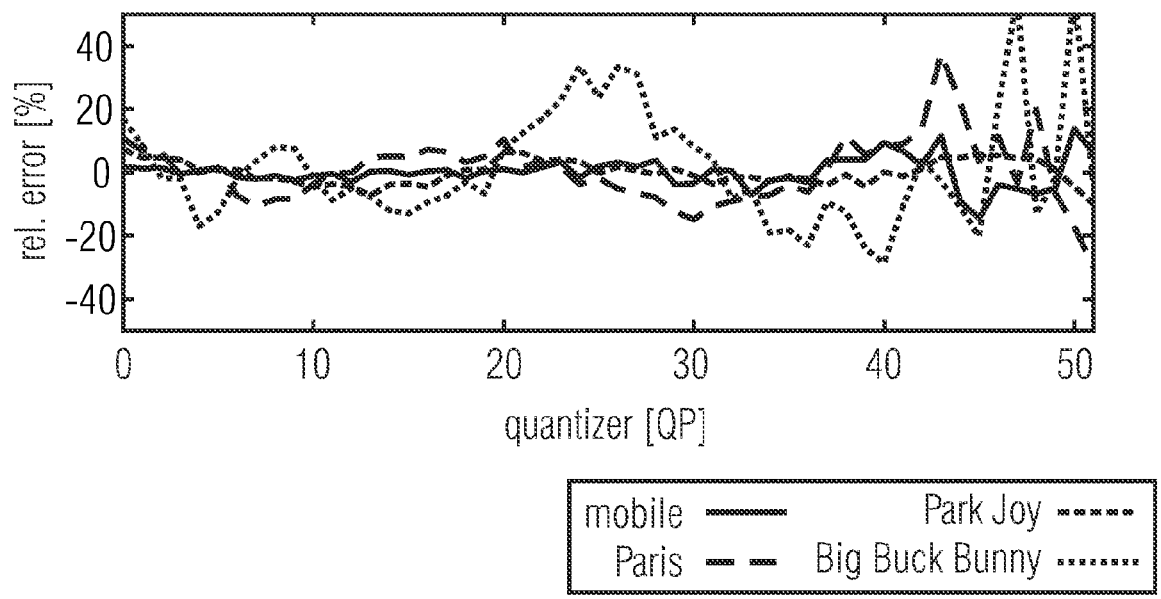

Indeed the model given by $f(q,\hat{\beta})$ is found to be a very accurate approximation of the actual R-Q function R(QP). This is also confirmed by the examples depicted in FIG. 6, where the model parameters were determined according to the previously described method. It also shows that the relative error remains similar for all QPs, i.e. the approximation quality is good over the entire domain.

Although the model $f(q,\hat{\beta})$ approximates the actual R-Q function very well there is still some error left. This can be expressed as $$\log(R(QP)/NP) = \log(f(q,\hat{\beta})) + \tilde{u}_q \quad (11)$$

where the approximation error $\tilde{u}_q$ is normally distributed with zero mean and variance $\tilde{U}$, i.e.

$$E[\tilde{u}_q] = 0 \quad E[\tilde{u}_q \tilde{u}_q^T] = \tilde{U} \quad (12)$$

C. State Formulation

According to (10), an appropriate parameter vector $\hat{\beta}_k$ may be found for every frame k. Using $\hat{\beta}_k$ the model $f(q,\hat{\beta}_k)$ approximately describes the rate-quantization characteristic $R_k(QP)$ of the corresponding frame. Now, suppose that $f(q, \hat{\beta}_k)$ can be represented by the vector $x_k$. Then, we can interpret this vector $x_k$ as the state of the R-Q model of frame k. We chose the following definition of $x_k$:

$$x_k = \begin{bmatrix} x_{k1} \\ x_{k2} \\ x_{k3} \\ x_{k4} \\ x_{k5} \end{bmatrix} = \begin{bmatrix} \log(f(0, \hat{\beta}_k)) \\ \log(f(\hat{m}_k, \hat{\beta}_k)) \\ f'(\hat{m}_k, \hat{\beta}_k)/f(\hat{m}_k, \hat{\beta}_k) \\ \hat{m}_k \\ \log(f(N, \hat{\beta}_k)) \end{bmatrix} \quad (13)$$

Actually, we could have taken $\hat{\beta}_k$ as the state. The reason for choosing it this way is that $x_k$ is only of size 5×1 as the used model function has only 5 independent parameters. Furthermore, this gives robust results and also enables the relatively easy calculation of the parameters $a_1, b_1, c_1$ and $a_2, b_2, c_2$. Taking the logarithm of $f(0,\hat{\beta}_k)$, $f(m_k,\hat{\beta}_k)$ and $f(N,\hat{\beta}_k)$ ensures that the model function has a positive range ($f(q, x) \geq 0$).

For notational simplicity the time subscript k in the remainder of this section is omitted, i.e. $x_1$ is the first element of the vector x. The function parameters are determined from the elements of the state vector x as $$a_1 = \exp(x_2) \quad b_1 = x_3 \cdot \exp(x_2)$$

$$c_1 = (\exp(x_1) - \exp(x_2) + x_3 \cdot \exp(x_2) \cdot x_4)/x_4^2$$

$$a_2 = x_2 \quad b_2 = x_3$$

$$c_2 = (x_5 - x_2 - x_3 \cdot (N - x_4))/(N - x_4)^2 \quad (14)$$

Therefore, the R-Q model 26 can be rewritten in terms of the state as $$f(q, x) = \begin{cases} f_1(q, x), & 0 \leq q \leq x_4 \\ f_2(q, x), & x_4 \leq q \leq N \end{cases} \quad (15)$$

with $$f_1(q, x) = e^{x_2} + x_3 e^{x_2}(q - x_4) + \frac{(e^{x_1} - e^{x_2} + x_3 e^{x_2} x_4)}{x_4^2}(q - x_4)^2 \quad (16)$$

and $$f_2(q, x) = \exp\left(x_1 + x_2(q - x_4) + \frac{x_5 - x_2 - x_3(N - x_4)}{(N - x_4)^2}(q - x_4)^2\right) \quad (17)$$

D. Model Constraints

Obviously the rate-quantization model should be positive over the whole range of quantization parameter. Furthermore, it should be monotonously decreasing with increasing QP. And finally, although in practice not perfectly true, the rate-distortion function should be convex. This is useful for some algorithms in video coding see e.g. [15] and moreover complies with rate distortion theory [1]. Accordingly, x is to fulfill $$f(q,x) \geq 0 \quad 0 \leq q \leq N$$

$$f'(q,x) \leq 0 \quad 0 \leq q \leq N$$

$$f''(q,x) \geq 0 \quad 0 \leq q \leq N \quad (18)$$

Due to the exponentials involved in (16), (17) and given that $f'(q,x) \leq 0$ actually $f(q,x) \geq 0$ is guaranteed. The remaining constraints can be given as $$x_3 \leq 0$$

$$(x_4 x_3 - 1)e^{x_2} + e^{x_1} \geq 0$$

$$2x_5 - (N - x_4)x_3 - 2x_2 \leq 0$$

$$(N-x_4)^2 x_3^2 + 2X_5 - 2(N-x_4)x_3 - 2x_2 \geq 0 \quad (19)$$

where the first two inequalities ensure $f'(q,x) \leq 0$ and the last two $f''(q,x) \geq 0$.

II. Kalman Filter

As will be described in a later section, the problem of finding the optimum parameters for the R-Q model can be considered as the problem of determining the state of a dynamic system. An optimum state of a linear dynamic system can be found using the Kalman filter. Accordingly, the Kalman filter is also the basis of the model parameter estimation algorithm presented in Sec. IV. This, in turn, is the reason why some Kalman filter fundamentals are explained in the remainder of this section.

A linear discrete time system can be defined as $$x_k = \Phi_{k-1} x_{k-1} + w_{k-1} \quad (20)$$

with the measurement equation $$y_k = H_k x_k + v_k \quad (21)$$

where $w_k$ is the process noise and $v_k$ is the measurement noise, both white, zero mean, uncorrelated and with covariance $E[w_k w_k^T] = Q_k$ or $E[v_k v_k^T] = V_k$, respectively. The vector $x_k$ represents the state of the system, $\Phi_{k-1}$ is the state transition matrix and $H_k$ relates the state to the measurement $y_k$. For such a system an optimal state $\hat{x}_k$ is found by applying the discrete time Kalman filter algorithm.

A. Discrete Time Kalman Filter

The discrete time Kalman filter (for a derivation see [17]) can be used to solve a linear discrete time system of the form described previously. It comprises the following computations for every time step or iteration k:

1) Prediction (State and Covariance Propagation)

$$\hat{x}_k^- = \Phi_{k-1} \hat{x}_{k-1}^+ \quad (22)$$

$$P_k^- = \Phi_{k-1} P_{k-1}^+ \Phi_{k-1}^T + Q_{k-1} \quad (23)$$

2) Correction (State and Covariance Update)

$$K_k = P_k^- H_k^T (H_k P_k^- H_k^T + V_k)^{-1} \quad (24)$$

$$\hat{x}_k^+ = \hat{x}_k^- + K_k(y_k - H_k \hat{x}_k^-) \quad (25)$$

$$P_k^+ = (I - K_k H_k) P_k^- \quad (26)$$

B. Sequential Kalman Filtering

The Kalman filter assumes that there are r separate measurements at time k. That is, there is an r×1 measurement vector $y_k$ which is used for correction in (25). However, there is no need to process all measurements at once. Instead, it is also possible to handle one measurement after another—which is the idea of the Sequential Kalman filter of FIG. 1. That means first $y_{0k}$ is processed, than $y_{1k}$ and so on until all r measurements were considered. Although this involves computing the Kalman filter correction equations r times this can still be very useful as the inverse in (24) simply becomes a division, i.e. no matrix inversion may be used.

The sequential Kalman filter can be especially beneficial if the measurement noise covariance matrix $V_k$ is diagonal. For other types of $V_k$ additional, time-consuming computations may be useful. In this cases the classical batch algorithm is usually better. A more detailed description of the sequential Kalman filter can be found in [17].

C. Colored Measurement Noise

Sometimes the noise corrupting a measurement is sequentially correlated, that is $$v_k = \psi_k v_{k-1} \pm \zeta_k \quad (27)$$

where $\zeta_k$ is zero mean white noise with covariance $$E[\zeta_k\zeta_k^T]=Z_k \quad (28)$$

As mentioned previously, the standard Kalman filter assumes $v_k$ to be white. There are two general ways to solve this problem, either by augmenting the state or by measurement differencing (see [2, 3]). As will be described later the advantageous approach for the problem considered here is a slightly modified version of the measurement differencing approach which was proposed by Petovello et. al. [13].

The measurement differencing approach presented by Bryson and Henrikson [3] defines a new measurement $y'_k$ $$y'_k=y_k-\psi_k y_{k-1} \quad (29)$$

Substituting (21) into (29) yields $$y'_k=H_k x_k+v_k-\psi_k(H_{k-1}x_{k-1}+v_{k-1}) \quad (30)$$

According to [13] we rearrange (20) as follows $$x_{k-1}=\Phi_{k-1}^{-1}(x_k-w_{k-1}) \quad (31)$$

and plug it into (30):

$$y'_k=H_k x_k+v_k-\omega_k(H_{k-1}(\Phi_{k-1}^{-1}(x_k-w_{k-1}))+v_{k-1}) \quad (32)$$

Using (27) we can rewrite this as $$y'_k=H'_k x_k+v'_k \quad (33)$$

where $$H'_k=(H_k-\psi_k H_{k-1}\Phi_{k-1}^{-1}) \quad (34)$$

$$v'_k=\psi_k H_{k-1}\Phi_{k-1}^{-1}w_{k-1}+\zeta_k \quad (35)$$

The noise $v'_k$ of the auxiliary measurement $y'_k$ is no longer sequentially correlated, i.e.

$$E[v'_k v'^T_j]=V'_k\delta_{kj} \quad (36)$$

where $\delta_{kj}$ is the Kronecker-Delta defined as $$\delta_{kj}=\begin{cases} 1 & i=j \\ 0 & \text{otherwise} \end{cases} \quad (37)$$

and $$V'_k=\psi_k H_{k-1}\Phi_{k-1}^{-1}Q_{k-1}\Phi_{k-1}^{-T}H_{k-1}^T\psi_k^T+Z_k \quad (38)$$

The introduced correlation between the new measurement noise $v'_k$ and the process noise $w_{k-1}$ is $$M_k=E[w_{k-1}v'^T_k]=Q_{k-1}\Phi_{k-1}^{-T}H_{k-1}^T\psi_k^T \quad (39)$$

This correlation can be handled by the general discrete Kalman filter which considers cross-correlation between disturbance input and measurement noise (see [17],[20]).

D. Extended Kalman Filter

The extended Kalman filter can be used if the measurement and the state are related in a nonlinear way, i.e.

$$y_k=h_k(x_k,v_k) \quad (40)$$

The idea of the extended Kalman filter is to linearize the measurement equation around the current state $\hat{x}_k^-$:

$$y_k=h_k(\hat{x}_k^-,0)+\frac{\partial h_k}{\partial x}\bigg|_{\hat{x}_k^-}(x_k-\hat{x}_k^-)+\frac{\partial h_k}{\partial v}\bigg|_{\hat{x}_k^-}v_k \quad (41)$$

Setting $$\tilde{H}_k=\frac{\partial h_k}{\partial x}\bigg|_{\hat{x}_k^-} \quad \tilde{M}_k=\frac{\partial h_k}{\partial v}\bigg|_{\hat{x}_k^-} \quad (42)$$

we get $$(y_k-[h_k(\hat{x}_k^-,0)-\tilde{H}_k\hat{x}_k])=\tilde{H}_k x_k+\tilde{M}_k v_k \quad (43)$$

This linear approximation is in the form which can be handled by the Kalman filter.

III. Measurements

Here, the measurements which are used in the next section to determine the parameters of the R-Q model are described. First, there are the so called complexity measures which can give an indication how complex it is to encode a frame. Same are determined and used by corrector 30. Second, we have the bitrate obtained after coding which reveals estimation errors of the current model. Same are determined and used by corrector 32.

A. Complexity Measures

There are various statistical measures which can be calculated by corrector 30 before the coding of a frame. This includes the mean value, the variance ($\sigma^2$) and the mean squared difference between predicted and the actual frame ($\Delta$). The latter one is only available if at least a rough motion estimation had been done such as in encoder 12. Alternatively, the popular MAD (mean absolute difference) used in several rate-distortion model estimation approaches could be used as a difference value.

Furthermore, variations of these measures, namely the mean logarithmic variance ($\sigma_{log}^2$) and the mean logarithmic difference ($\Delta_{log}$), may be used. The advantage of the latter two is that single outliers (e.g. macroblocks which can not be properly predicted) have not that much influence on the final value.

Unlike the variance-like measures, the prediction difference measures clearly depend on the coding of the last frame. That is, if the last frame was coded very badly, there is a prediction error even if nothing has changed between the two original frames. To overcome this dependency, the corruption which is due to the distortion of the reference frames has to be removed from the measured prediction difference. This is approximately possible by taking the QP and distortion of the reference frames as well as the variance into account. The result is just an estimate of the prediction difference measure which would have been obtained if the original frames had been used as reference.

The described complexity measures can indicate the coding characteristics of the corresponding frame. That means there is a relation between these measures and the parameters of the rate-quantization model. Accordingly, it is possible for corrector 30 to estimate the parameters or the state of the rate-quantization model, respectively as:

$$\tilde{x}=\begin{cases} h_p(\sigma^2,\Delta,\sigma_{log}^2,\Delta_{log}) & \text{for } P \text{ and } B \text{ pictures} \\ h_i(\sigma^2,\sigma_{log}^2) & \text{for } I \text{ pictures} \end{cases} \quad (44)$$

The relationship $h_i,h_p$ was obtained empirically by computing the rate-quantization relationship for various sequences. Note that $h_p$ also produces reasonable estimates when the current frame is the first frame of a new scene, i.e. $\Delta$ and $\Delta_{log}$ are very bad.

Using the state estimate $\tilde{x}_k$ we can formulate the following measurement equation for the frame k:

$$x_k=H_k\tilde{x}_k+v_k \quad (45)$$

where the 5×1 vector $v_k$ can be considered as the prediction error or the noise. According to the empirical derivation of

(44) it can be assumed that $v_k \infty N(0,V_k)$. Since $\tilde{x}_k$ is an estimate of the state, the matrix $H_k$ is just the identity matrix i.e.

$$H_k = I \tag{46}$$

Usually, the prediction error $v_k$ is highly correlated in time. The reason for this is that the complexity measures, like the rate-quantization characteristics, are similar for succeeding frames. This means for example that if the predicted state $\tilde{x}_k$ underestimates the complexity of the frame k, then it is very likely that the state $\tilde{x}_{k+1}$ predicted for frame k+1 also underestimates the complexity. Accordingly, $v_k$ is actually colored noise (compare Sec. II-C), i.e.

$$v_k = \psi_k v_{k-1} + \zeta_k \tag{47}$$

with $\zeta_k$ being uncorrelated in time and normally distributed with zero mean and covariance $Z_k$. That is $$E[\zeta_k] = 0 \; E[\zeta_k \zeta_j^T] = Z_k \delta_{kj} \tag{48}$$

where $Z_k$ was determined empirically. For simplicity we defined the 5×5 correlation matrix $Y_k$ as $$\psi_k = I \cdot \psi_k \tag{49}$$

where the scalar $0 \le \psi vhd\; k \le 1$. That is, the same correlation $\psi_k$ for every parameter $\tilde{x}_{ki}$, i=1, ..., 5 is assumed. This is reasonable as the correlation depends on the amount of change in the R-Q characteristic between the last and the current frame (which is the same for every parameter). In case of a scene change for example $\psi_k = 0$.

Figure 7:
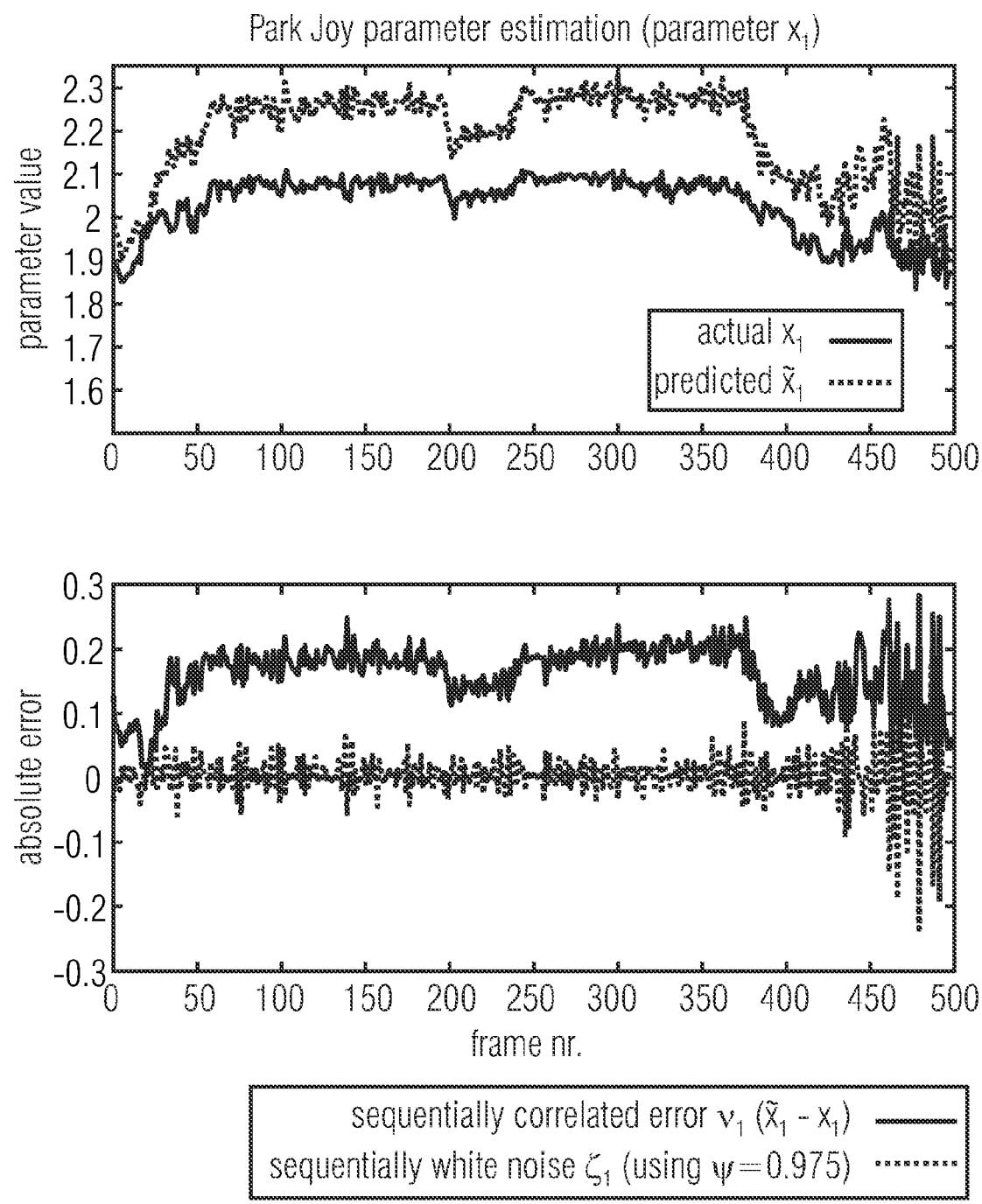
FIG. 7 illustrates the fact that the error in the complexity measure based prediction is usually sequentially correlated.

The sequential correlation of the prediction error is visualized for the parameter $x_1$ (first element of state vector x) in FIG. 7. As can be seen, the prediction $\tilde{x}_1$ constantly overestimates the actual value. The error ($\tilde{x}_1 - x_1$) is therefore sequentially correlated. Using (47) it is possible to get rid of the correlation and extract the remaining white noise.

Although not perfectly true (since all state parameters are predicted from the same complexity measures) it is assumed that there is no cross-correlation between the predicted parameters, i.e. $Z_k$ is a diagonal matrix. This gives the benefit that the Kalman filter equations can be calculated computationally efficient (without matrix inversion) by processing each measurement sequentially.

B. Coding Bitrate

Succeeding frames of a video sequence are in general very similar. Accordingly the R-Q characteristic of neighboring frames is highly correlated. This means, the more accurate the model at frame k the more accurately one can estimate the model for frame k+1. Therefore, it makes sense in FIG. 1 that the second corrector updates the model of frame k even if the frame was already encoded.

Consequently, the bitrate $B_k$ measured after coding of frame k with quantization parameter $QP_k$ is used as feedback to correct the R-Q model. Unfortunately, if the reference frames were coded with different quantization parameters, this rate may deviate from $R_k(QP_k)$ (the rate which would have been measured if the reference frames were also coded with $QP_k$, recall Sec. I). As the model, however, should approximate the actual R-Q curve $R_k(QP)$, a new bitrate $\tilde{B}_k$ is defined as $$\tilde{B}_k = \begin{cases} B_k = R_k(QP_k) & \text{ref. frames were coded with } QP_k \\ \gamma_k(B_k, QP_k) & \text{otherwise} \end{cases} \tag{50a}$$

where the goal of the function $\gamma_k$ is to estimate $R_k(QP_k)$ as good as possible from the actually measured rate $B_k$, that is $\gamma_k(B_k, QP_k) \approx R_k(QP_k)$. A simple choice would be $\gamma_k(B_k, QP_k) = B_k$, i.e. ignore the temporal dependency and just use the measured rate. However, based on statistical measures and the quantization parameter of the main reference frame it is also possible to calculate a $\tilde{B}_k$, which is more close to $R_k(QP_k)$. The rate $\tilde{B}_k$ can then be used to correct the model. According to (11), the following relationship exists between bitrate and state $$\log(\tilde{B}_k/NP) = \log(f(q_k, x_k)) + (u_k + t_k)$$

$$\tilde{y}_k = \log(f(q_k, x_k)) + \tilde{v}_k \tag{50b}$$

Note that this equation considers the errors between model and actual R-Q function for a sequence of frames (one specific QP per frame), whereas (11) considers the errors between model and actual R-Q function for various QPs (but only one frame).

As mentioned previously the error $u_k$ represents the inability of the model to perfectly represent the R-Q curve. The error due to different quantization off the reference frames is modeled by $t_k$. Obviously, this error is zero if the reference frames were coded with $QP_k$ as well. It is practically adequate to merge $u_k$ and $t_k$ into $\tilde{v}_k$ and consider it random white noise with zero mean and variance $\tilde{V}_k$, i.e.

$$E[\tilde{v}_k] = 0 \; E[\tilde{v}_k \tilde{v}_j^T] = \tilde{V}_k \delta_{kj} \tag{51}$$

IV. Model Parameter Estimation

In most papers the parameters of the quadratic R-Q model seem to be determined by liner least squares. The Kalman filter, however, although to a certain degree similar to (recursive) linear least squares [19], has some decisive advantages for this particular problem. These are mainly the inherent ability to adapt to variations, the consideration of uncertainty (noise) and the possibility of incorporating several measurements.

As mentioned previously the rate-quantization characteristic of video frames is, except for scene changes, highly correlated in time. That means the R-Q function of one frame is usually similar to the one of the next frame. Consequently, this correlation can be exploited to enhance the accuracy of the model. Naturally, however, video and by that its rate-quantization characteristic is dynamic. That means it changes, usually slowly, with time. Naturally the model is adapted to the changed R-Q relationship.

Accordingly, the problem of estimating the R-Q model is considered as the problem of estimating the state of the following dynamic discrete time system $$x_k = \Phi_{k-1} x_{k-1} + w_{k-1} \tag{52}$$

The state vector $x_k$ represents the parameters of the R-Q model as defined in Sec. I-C. Since there is no deterministic change of the R-Q characteristic from one frame to the next the state transition matrix $\Phi_k$ is the identity matrix i.e.

$$\Phi_k = I \tag{53}$$

The process noise $w_k$ is defined as $$E[w_k] = 0 \; E[w_k w_j^T] = Q_k \delta_{kj} \tag{54}$$

with the disturbance noise covariance matrix $Q_k$ which models the uncertainty that the last state also holds for the current frame.

To find an optimum estimate of the state of the dynamic system given by (52) with the measurements (45) and (50) the apparatus 10 implements a modified version of the discrete Kalman filter. The principal working of this modified Kalman filter as well as the involved data is visualized for a frame k in FIG. 8. A detailed description of the individual algorithm steps is given in the following.

Figure 8:
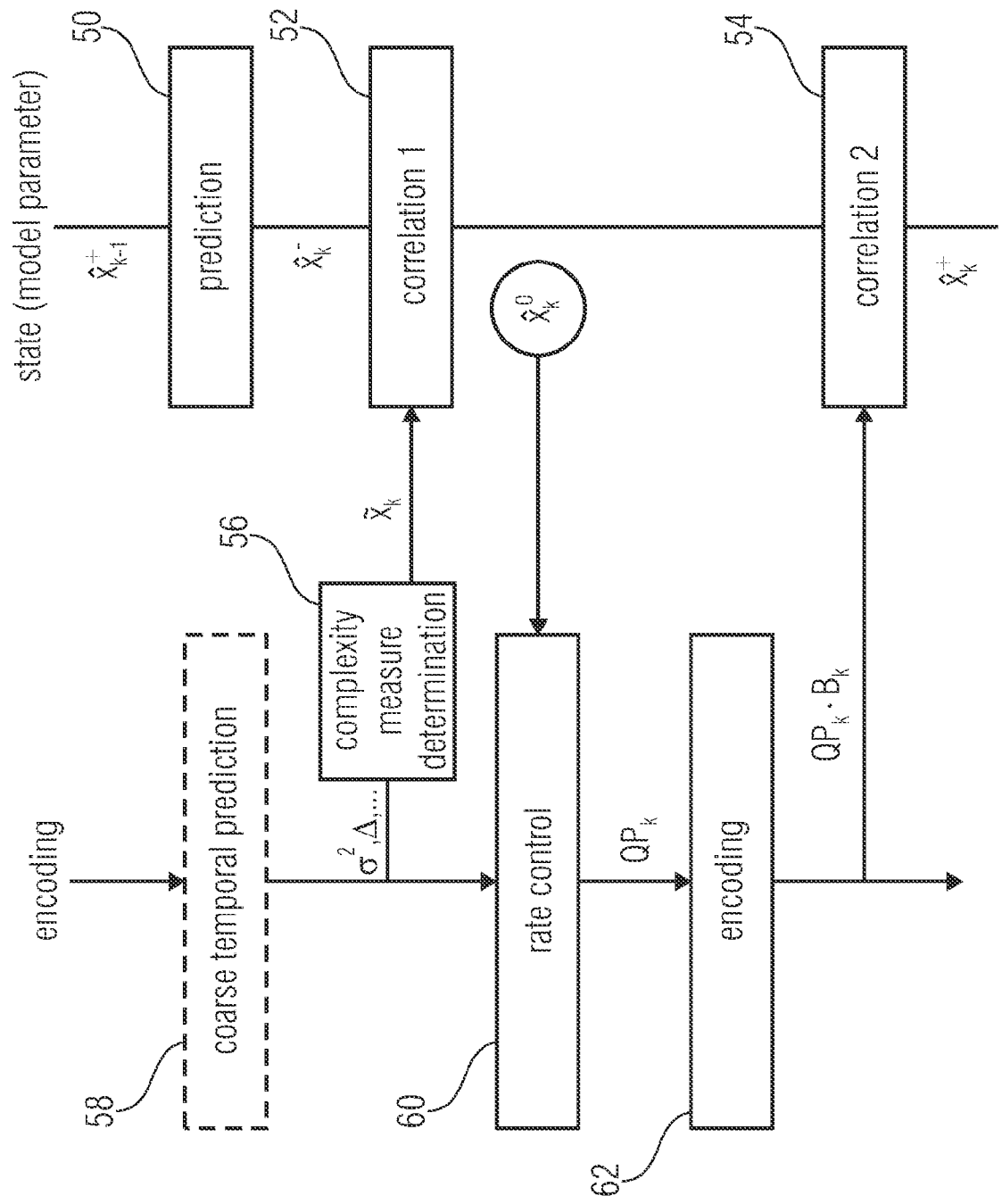
FIG. 8 shows the design of one cycle of a Kalman filter based algorithm executable on the apparatus of FIG. 1, wherein the R-Q model parameters are estimated in three steps which are repeated for every frame k.

That is, FIG. 8 shows steps which may be performed by the elements of FIG. 1 in accordance with a specific implementation further outlined below. In accordance with this implementation, elements 28, 30 and 32 realize the extended Kalman filter.

A. Prediction

The first step in the cycle of the algorithm, concerning the current frame k, shown in FIG. 8 is the prediction step 50 performed by updater 28, for example.

In the prediction step 50 the corrected state and covariance matrix of the last frame are used to predict same for the current frame in time, i.e. for the current frame k. Using (53) in (22) and (23) we get $$\hat{x}_k^- = \hat{x}_{k-1} \quad (55)$$

$$P_k^- = P_{k-1}^+ + Q_{k-1} \quad (56)$$

As can be seen, without more information the best estimate of the state for the current frame k is just the a posteriori state estimate of the last frame k−1. However the uncertainty in the state has increased by $Q_{k-1}$.

These computations 55 and 56 are performed by updater 28 within prediction step 50.

B. Correction

As already outlined above, the correction of the modified Kalman filter algorithm of FIG. 8 is split-up into two correction steps 52 and 54 performed by the first corrector 30 and the second corrector 32, respectively.

In this phase 52, 54 the measurements are used to correct the state. As described in Sec. III we have two types of measurements. The state predicted from the complexity measures and the bitrate obtained after encoding. Usually all measurements are packed into the measurement vector and are then used for updating the state. However, in this case the state predicted from the complexity measures is available before actually coding the frame, whereas the bitrate is only available after that. However, it is important to have a good rate-quantization model before coding as it may be used by the rate control such as controller 18 to determine the quantization parameter. Obviously the model and by that the rate control would not be as good as they could be if we consider the complexity measures only after coding. Therefore, unlike the classic Kalman Filter, the correction phase is divided into two steps. In the first step 52 the complexity measures and in the second step 54 the bitrate are used to update the state.

This division is indeed possible according to the sequential Kalman filter described in II-B. Furthermore, a two-step correction can be easily employed as no correlation between the error of the elements of the predicted state $v_k$ and the error of the measured bitrate $\tilde{v}_k$ is assumed, i.e.

$$E[v_{ik}\tilde{v}_k^T]=0 \; i=1,\ldots,5 \quad (57)$$

This assumption is admissible as the two types of errors originate from completely different shortcomings. The error of the predicted state is due to the limitations of the complexity measure prediction, whereas the error of the measured rate is due to the inability of the model to perfectly match the actual R-Q function. That means that a correlation between these two types of measurements is very unlikely. Indeed practical experiments showed no significant correlation between the predicted state and the measured bitrate.

1) Correction Step 1:

The first correction step 52 performed by first corrector 30 involves a step 56 of determining the complexity measure $\tilde{x}_k$ by first corrector 30. As mentioned above, the best determination may involve encoder 12 performing a coarse temporal prediction 58 such as performing a full pel motion estimation so as to predict the current frame k from the previous frame k−1. It should be noted that encoder 12 does not necessarily use the immediately previously encoded frame as reference frame. The reference is also not restricted to being the immediately preceding one in terms of presentation time sequence. Encoder 12 is free to choose the reference index, i.e. is free to index any previously encoded frame as reference frame. Then, in the first step 52, the state predicted from the complexity measures $\tilde{x}_k$ as defined in (44) is used to improve the estimation quality of the R-Q model for the current frame. To address the sequential correlation of the prediction error, the measurement differencing approach described in Sec. II-C may be used. According to (29) an auxiliary measurement $y'_k$ is defined as $$y'_k = \tilde{x}_k - \psi_k \tilde{x}_{k-1} \quad (58)$$

Plugging (53), (46) into equation (34) the new measurement matrix $H'_k$ becomes $$H'_k = I - \omega_k I \quad (59)$$

The Kalman gain $K'_k$ for this step is $$K'_k = (P_k^- H'_k{}^T + M_k)(H'_k P_k^- H'_k{}^T + H'_k M_k + M_k^T H'_k{}^T + V'_k) \quad (60)$$

where $$V'_k = \psi_k Q_{k-1} \psi_k^T + Z_k M_k = Q_{k-1} \psi_k^T \quad (61)$$

This was obtained by using (46) and (53) in (38) and (39) respectively. Note that (60) is just the formula for the Kalman gain in case of cross-correlated disturbance and measurement input as given in [17] or [20]. Using the Kalman gain $K'_k$ we can get the intermediate state estimate $\hat{x}_k^0$ by updating the state as follows $$\hat{x}_k^0 = \hat{x}_k^- + K'_k(y_k' - H'_k \hat{x}_k^-) \quad (62)$$

Similar the process noise covariance update for this step becomes $$P_k^0 = P_k^- - K'_k(H'_k P_k^- + M_k^T) \quad (63)$$

That is, first corrector 30 may compute (58) in order to obtain the measurement value $y_k'$ and may correct the Kalman state according to (62) along with the associated uncertainty according to (63) by setting the measurement matrix according to (59) and setting the Kalman gain according to (60) and (61).

2) Correction Step 2:

The outcome of the first correction step 52 is the primarily corrected state $\hat{x}_k^0$ and as described above, this estimate of the model parameters may be used to control the coding rate of the encoder by, for example, rate controller 18 or some internal entity of encoder 12 itself (this alternative is not shown in FIG. 1). The rate control step is shown in FIG. 8 with reference sign 60. In particular, step 60 involves choosing a predetermined quantization $QP_k$ for encoding the current frame k based on the rate-quantization model function as determined by $\hat{x}_k^0$. The actual encoding is performed in step 62 by encoder 12 using this predetermined quantization. As a result, the actual coding rate $B_k$ resulting from the use of the chosen predetermined quantization $QP_k$ as known and may be used in the second correction step 54. In this step 54 the bitrate obtained after coding is used as feedback for the R-Q model 26. That means the state is corrected according to the relation (50b). As this relation is nonlinear (due to log(ƒ(q,x))) the extended Kalman filter (see Sec. II-D) is used, according to which the measurement equation around the current state $\hat{x}_k^0$ is linearized according to:

$$\tilde{y}_k = \log(f(q_k, \hat{x}_k^0)) + \frac{\partial \log(f)}{\partial x}\bigg|_{q_k, \hat{x}_k^0} (x_k - \hat{x}_k^0) + \tilde{v}_k \quad (64)$$

Now we define $\tilde{H}_k$ to be the gradient of $f(q_k,x)$ at $\hat{x}_k^0$ $$\tilde{H}_k = \frac{\partial \log(f)}{\partial x}\bigg|_{q_k, \hat{x}_k^0} \quad (65)$$

then we can rewrite (64) as $$\tilde{y}_k - [\log(f(q_k, \hat{x}_k^0)) - \tilde{H}_k \hat{x}_k^0] = \tilde{H}_k x_k + \tilde{v}_{k9} \quad (66)$$

Using the left side as the measurement in (25) the measurement update for this step becomes $$\hat{x}_k^+ = \hat{x}_k^0 + \tilde{K}_k(\tilde{y}_k - [\log(f(q_k, \hat{x}_k^0)) - \tilde{H}_k \hat{x}_k^0] - \tilde{H}_k \hat{x}_k^0) \quad (67)$$
$$= \hat{x}_k^0 + \tilde{K}_k(\tilde{y}_k - \log(f(q_k, \hat{x}_k^0)))$$

The Kalman gain $\tilde{K}_k$ as well as the updated covariance matrix $P_k^+$ are computed according to the usual formulas (24) and (26), i.e.

$$\tilde{K} = P_k^0 \tilde{H}_k^T (\tilde{H}_k P_k^0 \tilde{H}_k^T + \tilde{V}_k)^{-1} \quad (68)$$

$$P_k^+ = (I - \tilde{K}_k \tilde{H}_k) P_k^0 \quad (69)$$

That is, the second corrector 32 linearizes the rate-quantization model function $f$ at the used quantization $q_k$ and the primarily predicted state of the model parameters $\hat{x}_k^0$, according to (65) in order to obtain the measurement matrix and computes (67) in order to update the Kalman state and (69) in order to update the corresponding uncertainty according to (64), (66) and (68).

As mentioned above with respect to (50a) and (50b), the second corrector 32 may be configured such that the measurement value depends on the measured coding rate 42 of the video encoder 12 in a manner dependent on a relationship between the predetermined quantization $q_k$ used in encoding the current frame k and a further quantization used by the video encoder 12 in encoding a previously encoded reference frame, from a reconstructed version of which the video encoder 12 predicted the current frame by motion compensated prediction.

In the above discussion of FIG. 8, it has been neglected that updater 28 has to somehow predict the disturbance noise covariance matrix $Q_k$, and that the same applies for the first corrector 30 who has to additionally select the measurement noise covariance matrices $Z_k$ and $\tilde{V}_k$. In the following section C, possible selections are discussed along with a possible selection for the correlation matrix $\psi_k$.

C. Controlling the Estimation

The appropriate fusion of the different information available is controlled by $Q_k$, $Z_k$, $\tilde{V}_k$ and $\psi_k$. The matrices model the uncertainty in the measurements and the state. By selecting them properly a reasonable estimate of the state and by that of the rate-quantization model may be obtained.

Due to the variability of the R-Q characteristic of video frames they may, advantageously, be adapted for every frame.

The matrix $Q_{k-1}$ represents the uncertainty that $\tilde{x}_{k-1}$ is also a good estimate for frame k. This uncertainty is due to the change of the coding characteristic from one frame to another. That means if two succeeding frames (and by that the corresponding R-Q functions) are very different the uncertainty increase should be high. If on the other hand two frames are almost identical the state of the last frame is very likely appropriate for the current frame too. Similarly, the correlation between the parameter estimate $\tilde{x}_{k-1}$ and $\tilde{x}_k$ and by that the appropriate selection of $\psi_k$ and $Z_k$ can also be considered as depending on the amount of change in the R-Q relation from one frame to the next.

Suppose the example of a scene change between frame k−1 and k. In this case the main diagonal elements of the process noise covariance $Q_{k-1}$ should become infinite so that there is no certainty in the state anymore. This is useful as the rate-distortion characteristics of frames beyond scene changes are not correlated. By a similar reasoning we can conclude that the correlation parameter $\psi_k$ should become zero and $Z_k = V_k$ in that case. Accordingly if there is a scene change all temporal information is neglected and the state $\tilde{x}_k$ predicted from the complexity measures becomes the best possible state estimate.

The value of $\tilde{V}_k$ does not directly depend on the change in the R-Q model. If it would only model the error between the model function and the actual R-Q relationship $\tilde{V}_k$ could be kept constant. However, as it also has to model the possible deviation of $\hat{B}_k$ from $R_k(QP_k)$, it may be increased advantageously in case that the reference frames were coded with other QPs.

V. Remarks

As indicated in FIG. 8 the rate control 60 uses the rate-quantization model based on the state estimate obtained after the first correction step 52. That means the rate control assumes that $f(q, \hat{x}_k^0)$ represents the relationship between the quantization parameter and the rate for frame k.

Assuming no correlation in the approximation error of succeeding frames (Eq. (51)) actually possesses some remarkable consequences. If a similar QP is chosen for encoding, the model will become more accurate in the range of the used quantization parameter. This means the model might not longer be optimal over the whole QP range but it is likely to be better around the QP values currently used. This is a very useful behavior as often only a small range of QP values is considered by the rate control. On the other hand if QPs from the whole possible range [−BDO,51] are used than the model will become globally optimal in the sense of (10), i.e. the model has the same estimation quality for all quantization parameter. This means that the accuracy of the model automatically adjusts to the QP selection behavior.

Both the correction and the prediction and by that the estimated model assume that the coding of the current frame does not depend on the coding of the previous frame. As described in Sec. I this is however not true. The deviation between the actual operational rate-quantization curve from the estimated rate-quantization model can again be modeled. This is, however, only important if one has to know the exact bitrate. If the bitrate is to fit only in the long-term then the raw rate-quantization model actually is sufficient or even gives the better information.

Besides the method proposed in Sec. II-C there are other ways to handle sequentially correlated measurements, for example state augmentation or the classical measurement differencing approach. Whereas the state augmentation approach would involve 10×10 matrix computations and might be numerically unstable, the classical measurement differencing approach is difficult to apply sequentially. The disadvantage of the used approach is usually that it needs the inverse of the state transition matrix $\Phi$. As in this case, however, $\Phi^{-1}=I^{-1}=I$ this is no problem.

Similarly, the extended Kalman filter is not the only method to handle nonlinear systems. Further approaches are, for example, described in [17]. However, the extended Kalman filter is regarded adequate for the specific problem considered in this paper. This is due to its computational simplicity and the fact that it provides appropriate results despite the linearization error.

Although very seldom, it might happen that the updated state returned by the Kalman Filter violates one or more of the constraints (19). In this case a valid state can be obtained by using on of the approaches to constrained Kalman filtering described in [16].

Note that the measurements can be processed sequentially avoiding the need for matrix inversion. In addition many matrices are sparse and or symmetric. This can be exploited to reduce the processing time.

The rate-distortion characteristic of I pictures is different from that of P or B pictures. Therefore, measurements for I pictures should not be used to update the rate-quantization model for temporally predicted pictures.

The rate-quantization characteristic of a frame also depends on the picture type and the temporal distance to the reference frames. If, for example, the frame prediction structure IbBbPbBbP is used, the R-Q relation of the P-frames is very different from that of the b-frames. In such a case there should be one instance of the algorithm for each picture type (4 for the previous example). An instance includes the state estimate $\hat{x}$ and the corresponding error covariance matrix P. Of course, the index k−1 refers in this case to the previously coded frame of the same type. In other words, the apparatus 10 of FIG. 1 could be configured such that the frame sequence it operates on is a proper subset of the video sequence 14 in that the frame sequence merely comprises frames of a specific prediction type and excludes frames of differing prediction type of sequence 14. Either several apparatuses 10 would be provided in parallel, each for a different prediction type, or the apparatus would manage different Kalman states and associated uncertainties, i.e. one pair for each prediction type.

VI. Results

To demonstrate the potential accuracy of the proposed model, we computed the actual rate-quantization curve R(QP) for the frames of various sequences. After that we fitted the quadratic as well as the just presented model to the measured R-Q functions. The fitting was done according to (10) for both models in order to get comparable figures. The mean approximation error was measured as follows:

$$\bar{\xi}(\text{model}) = \frac{100\%}{MN} \sum_{k=0}^{M} \sum_{QP=-BDO}^{51} \frac{|\text{model}(QP, \hat{\beta}_k) - R_k(QP)|}{\min(\text{model}(QP, \hat{\beta}_k), R_k(QP))}$$

with M being the number of frames considered. Results for various sequences for the quadratic model (The quadratic model is usually only defined for the 8 bit case. For the 12 bit case we used what we believe is the straightforward extension) (Eq. (1)) and for the proposed model (Eq. (4)) are summarized in Table 1.

TABLE 1

Comparison of the mean approximation error of the quadratic and the proposed model

|  | Sequence name | $\bar{\xi}$(Quadratic model) | $\bar{\xi}$(Proposed model) |
| --- | --- | --- | --- |
| CIF | Mobile | 46.909% | 2.8051% |
|  | Paris | 29.279% | 5.5818% |
|  | Football | 27.917% | 2.7827% |
| 720 p | Park Joy | 50.950% | 3.5424% |
|  | Ducks Take Off | 54.410% | 2.2493% |
|  | Old Town Cross | 103.15% | 8.5804% |
|  | Big Buck Bunny | 47.652% | 6.8316% |
| 720 p | Park Joy | 562.17% | 3.8128% |
| (12 bit) | Crowd Run | 539.01% | 3.3763% |
|  | In To Tree | 347.21% | 6.1782% |

As can be seen in this table the just presented model clearly outperforms the quadratic model, especially for the case of 12 bit sample depth.

Figure 9:
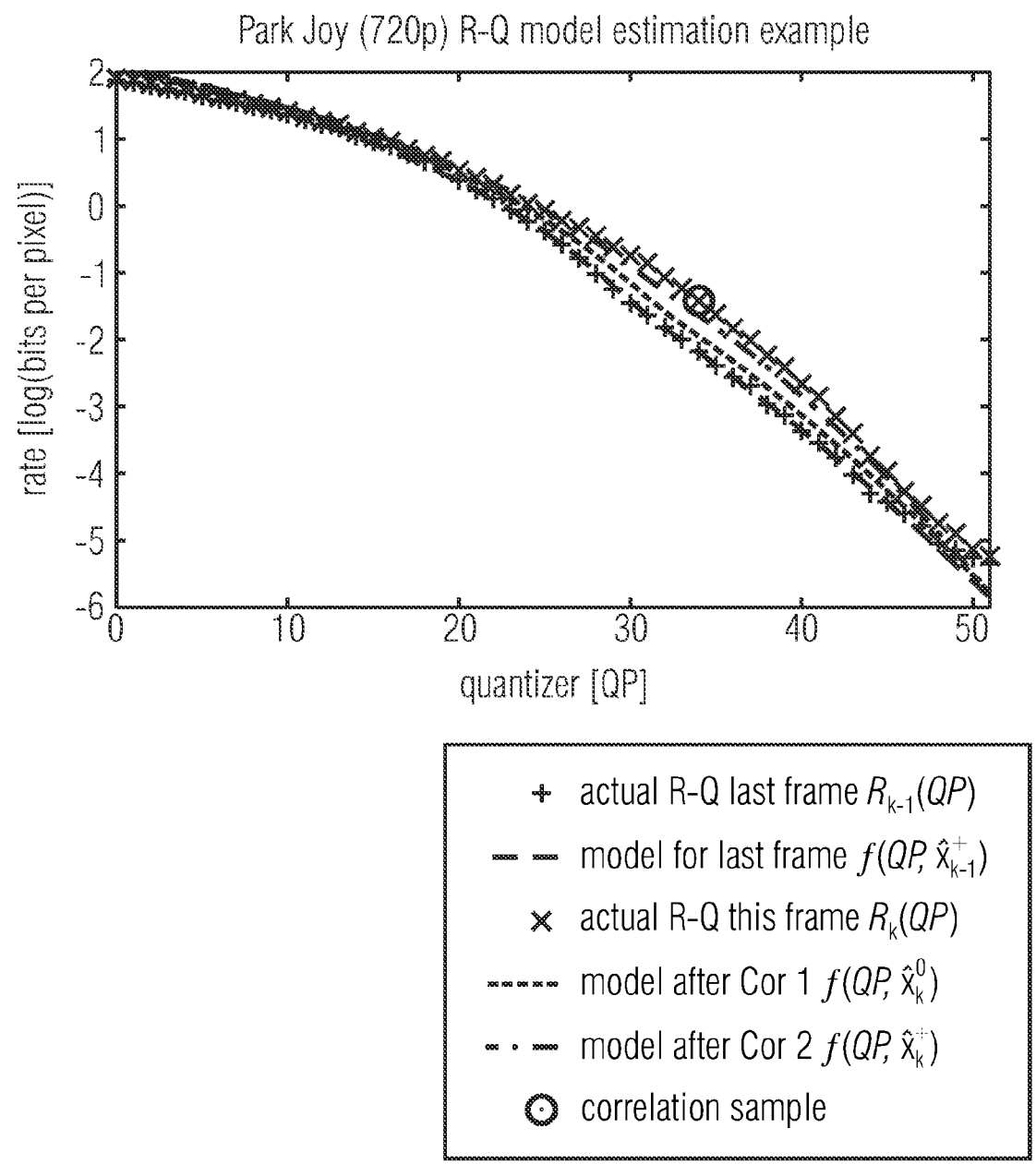
FIG. 9 shows a visualization of one cycle of the defined rate-quantization model and approximation technique according to an embodiment.

To get an impression of the presented estimation algorithm, an example step is visualized in FIG. 9. Note that this big difference between the rate-quantization characteristic of two consecutive frames is rather unusual. For demonstration purposes it is, however, a good example. As can be seen, the correction step 1 already recognizes that the current frame is more complex to encode than the last one. However, the measured rate indicates that $f(QP,\hat{x}_k^0)$ still underestimates the true rate-quantization characteristic. Therefore, the correction step 2 drags the model function even higher. Note that the corrected R-Q curve does not run through the sample used for correction exactly. This is due to the fact that we use $\tilde{V}_k > 0$ which prevents the model from oscillating (the bitrate often oscillates from frame to frame).

Figure 10:
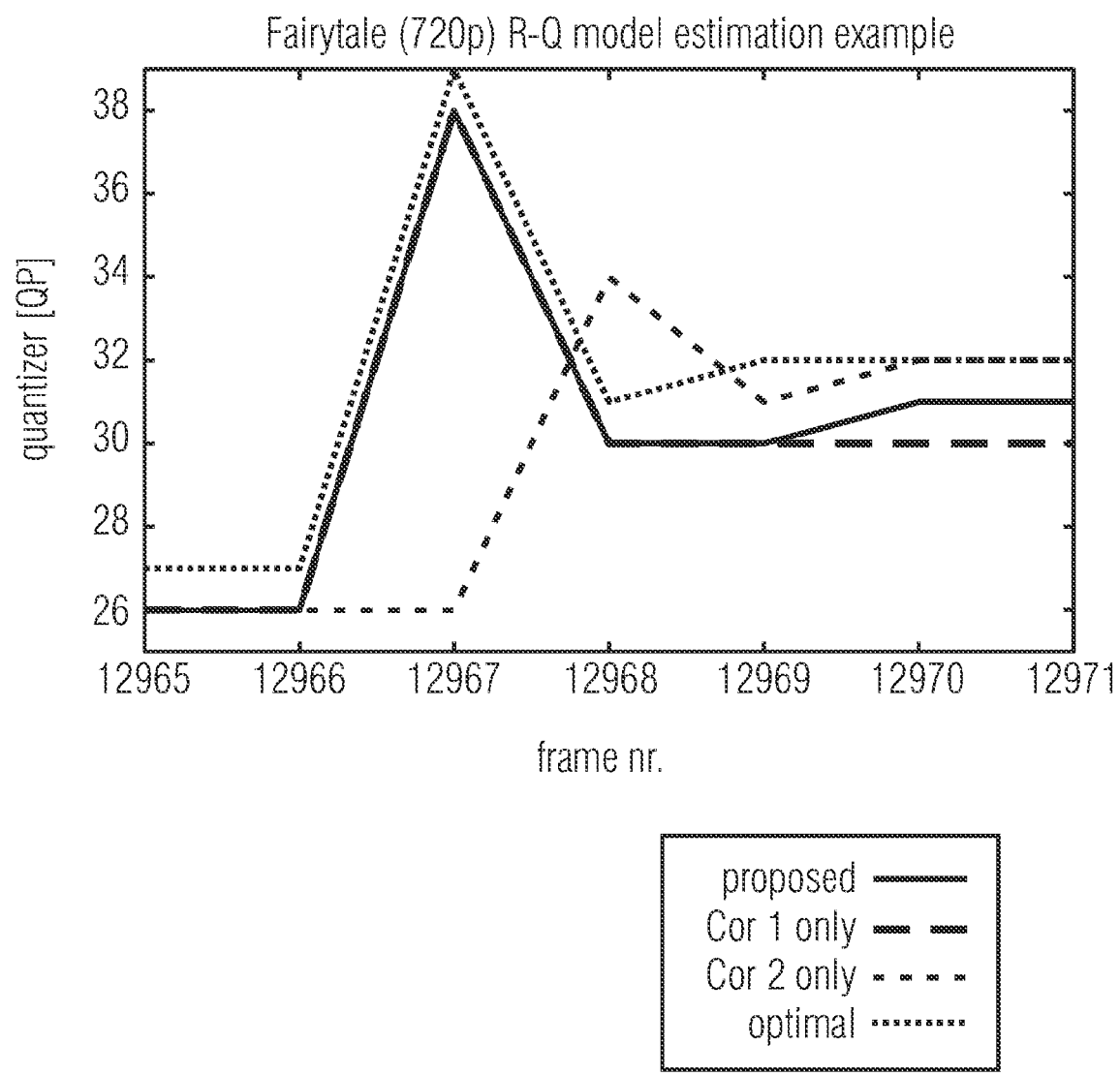
FIG. 10 shows a model estimation example in case of a scene change with the goal of constant bitrate (500 kbits per Frame)
Figure 11:
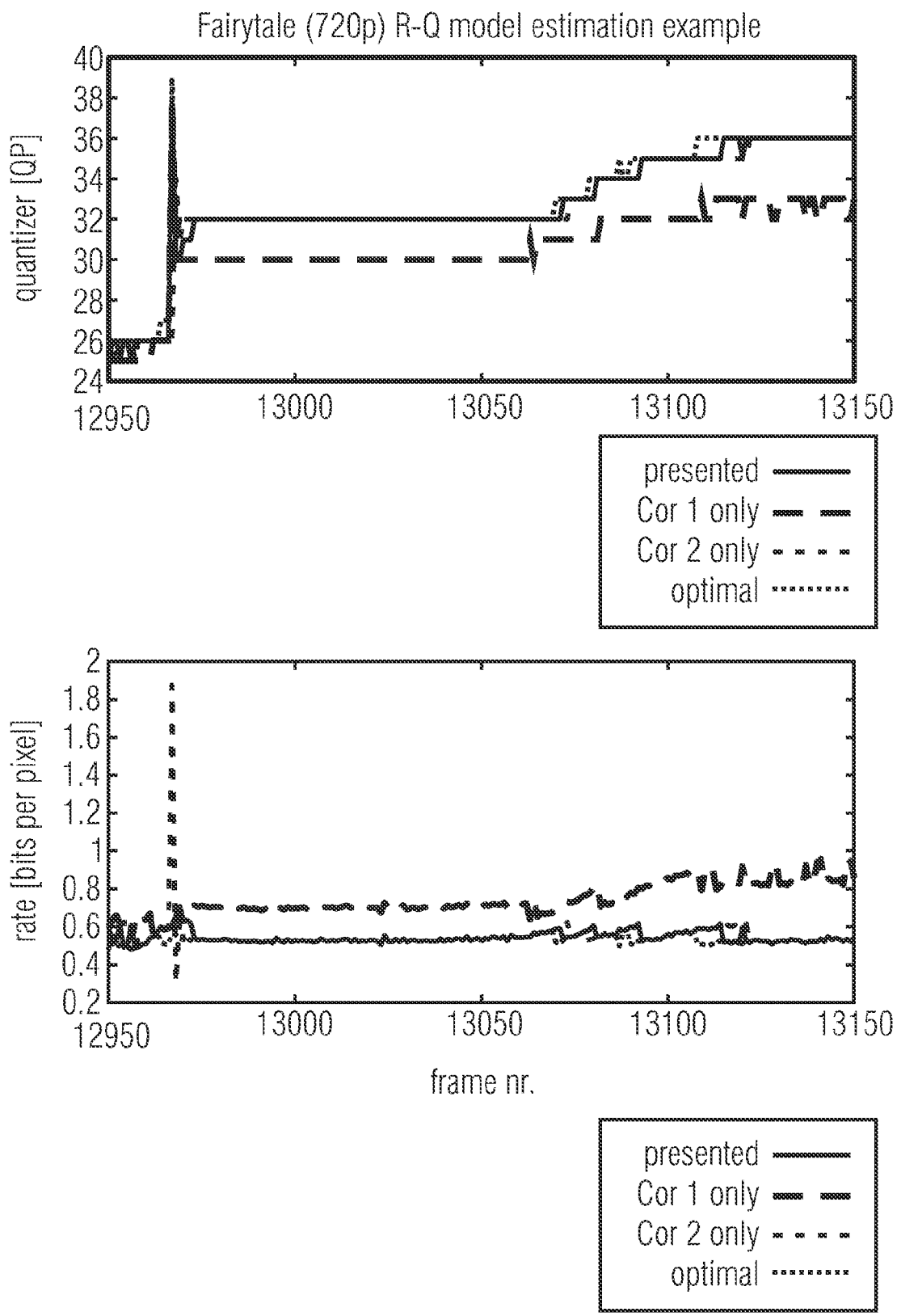
FIG. 11 shows model based QP and rate selection over a period of 200 frames when a constant bitrate of 500 kbits per Frame ($\approx$0.54 bits per pixel in case of 720p) should be achieved.

In FIGS. 10 and 11 we see the estimation from another perspective. There we see an exemplary use of the R-Q model in a low delay scenario. The rate control wants to find that QP which results in the given target rate (in this case 500 kbits per frame). That is the optimal QP would be $$\underset{-BDO \leq QP \leq 51}{\arg\min} |R_k(QP) - \text{target\_rate}| \quad (70)$$

As $R_k(QP) \approx NP \cdot f(q,\hat{x})$, the rate control uses that quantization parameter for which $|f(q,\hat{x}) - \text{target\_rate}/NP|$ is minimized. In these figures we compare the optimal QP choice, with the QP chosen according to the R-Q model and with the QP chosen if only the state predicted from complexity measures is considered (Cor 1 only) or if only the rate measured after coding is used for correcting the model (Cor 2 only).

From FIG. 10 we see that in case of a scene change we can only rely on the state prediction from complexity measures. The correction using the measured rate is important to get rid of the bias in the predicted state. This is shown in FIG. 11 where the selected QP and the corresponding rate is displayed for a longer period. By combining both corrections a solution which is rather close to the optimum can be found (see FIG. 10 and FIG. 11).

VII. Conclusion

Thus, the above described model is able to approximate the various possible rate-quantization curves resulting by coding with H.264/AVC very accurately. This holds true for the whole quantizer range. Comparisons with the commonly used quadratic model show that it provides a considerable better quality. The problem of estimating the parameters for this and other models may be solved by using a modified version of the Kalman filter. This allows consideration of the temporal correlation as well as the available complexity measures. The result is a sophisticated yet straightforward algorithm which is perfectly controllable via the noise covariance matrices and the correlation parameter. The excellent quality of this model and its estimation could be confirmed by various simulations and tests.

Thus, in even other words, the above embodiments combined both aspects in the form of a Kalman filter based estimation of a piecewise defined rate-quantization model for a H.264/AVC. On the one hand, an advantageous frame layer rate-quantization (R-Q) model for the H.264/AVC video coding standard has been used. In particular, both the advantageous model function along with an advantageous parameter estimation algorithm has been used in the embodiment outlined above. The piecewise defined model function is able to represent the various different shapes of rate-quantization curves very well. For the model parameter estimation, an algorithm has been used which is based on a modified version of the Kalman filter. By this, the temporal correlation of successive frames can be exploited and at the same time the complexity measures as well as the bit rate obtained from the coding can be considered. Using the described model and parameter estimation algorithm the actual rate-quantization curve can be predicted with high accuracy. A high quality R-Q model can be very beneficial for various one pass rate control problems, like e.g. low delay rate control as well as for rate-distortion optimization problems. In other words, the model is able to accurately represent the rate-quantization relationship of a H.264/AVC encoded frame. Furthermore, the algorithm described is able to estimate the parameters of this model properly. Unlike many other approaches, the above embodiment strictly separates between rate control and an R-Q model. The rate-quantization model along with the parameter estimation allows for the rate control to decide which quantizer to use. Obviously, this has the advantage that different rate control types can use the same R-Q model.

However, both aspects, namely the model function and the parameter estimation based on the Kalman filter are advantageous even if exploited isolated from the other. That is, the piecewise model function outlined above could be used in an apparatus for estimating model parameters which does not use or implement a Kalman based parameter estimation comprising the first and the second corrector as outlined above. The advantages result from the well defined compromise between a to high number of model parameters so that the stability in estimating the model parameters would be endangered, and a to low number of model parameters so that the approximation is bad. On the other hand, the Kalman based model parameter estimation comprising the first and second correctors as outlined above may also be used in connection with other rate-quantization model functions than the piecewise one outlined above, and the advantage results from splitting-up the correction process into two steps so as to exploit as precise measurement values as possible in each correction step. The Kalman based model parameter could even be used for estimating model parameters of a distortion-quantization model function so as to approximate an actual distortion-quantization function of a video encoder. In that case, the actual coding distortion at the predetermined quantization as obtained, for example, by the primarily corrected Kalman filter state, would be used for the secondary correction step. The rate control would still control the coding rate with using, however, the distortion-quantization model function, or both rate-quantization and distortion-quantization model function.

The rate-quantization model function outlined above approximates the R-Q relationship in form of a piecewise defined function. It consists of, or comprises at least, two pieces. The first, i.e. finer quantization piece, is a quadratic function which covers the low quantizer range. The second, a coarser quantization piece, is an exponential function which represents the R-Q relationships at high QPs. This function is heuristically determined. However, it has been motivated by the characteristic of the actual R-Q relationship. The transition point between the quadratic and exponential function piece is itself variable. By this, the model becomes very adaptable. This is advantageous as the shape of the actual R-Q function can be quite different. This is also due to the fact that the model function can be used for the case of 8, and 12 bits bit-depth, for example. By placing restrictions on the parameter, it is ensured that the function is continuously differentiable ($C^1$). The remaining five parameters can be used to the fit the model to the actual R-Q function with high accuracy.

On the other hand, the above described R-Q model parameter estimation considers the problem of estimating the model parameters as the problem of estimating the state of a dynamic discrete time system. This is valid as the R-Q characteristic of succeeding frames is highly correlated, however, may change slightly.

Accordingly, a modified Kalman filter is used to determine an optimum state of the system and by that the optimum parameter of the respective R-Q model. The Kalman filter based algorithm described above comprises three major steps which are executed for every frame and are briefly summarized again here:

1) Time update: There is no deterministic change of the R-Q characteristic from one frame to the other. Therefore the state of the last frame is taken as the first estimate for the current frame. The uncertainty of the state, however, is increased.

2) First Correction: Complexity measures are, for example, the variance and the prediction error. These measures are available before coding and can be used to directly predict the parameter of the model for the current frame. Unfortunately, this prediction itself is very inaccurate (due to the limitations of the complexity measures). Therefore the predicted parameter are taken as a measurement in the Kalman filter algorithm. There they are used to correct the current state. Due to the sequential correlation of the noise of the predicted parameters, a measurement differencing approach is used advantageously.

3) Second Correction: After the coding of the current frame, the number of bits needed for coding can be used to correct the state. Due to the nonlinear relation between measurement and state, the measurement equation around the current state is linearized (approach of the extended Kalman filter). This correction makes sense although the frame was already coded. The reason for this is the high correlation between successive frames, i.e. the better the model for the current frame the better the model for the next frame. Naturally, also a linear R-Q model (linear in the model parameter) could be used in connection with the above embodiments. In this case, the linearization just results in a standard Kalman Filter based algorithm, and the linearization would not be needed though same does not change anything. In other words, the above embodiment may be extended to operate with a standard Kalman Filter rather than an extended Kalman Filter. The linearization at the second corrector is not performed. Rather, the relation between the model parameters and the coding rate in accordance with the rate- or distortion-quantization model function 26 for the tested or chosen quantization at the primarily corrected state would be already linear.

The rate-control uses the model based on the state obtained after step 2. It usually makes sense to use this model for the frame and slice layer. An exact model is especially useful for low delay scenarios. If the frame QP is already optimal than only few changes have to be done on the macroblock level which avoids a significant drop in R-D performance. This also justifies the overhead of computations compared to simpler models.

Usually the Kalman filter consists of only two steps. However due to the fact that step 1 one can done before but step 2 only after coding we divided the correction phase into two steps to provide the most accurate model possible to the rate-control. This is possible according to the sequential Kalman filter and the fact that there is no cross correlation between the measurement of step 1 and the measurement of step 2.

The uncertainties of the state can be accurately modeled by the noise covariance matrices of the Kalman filter. This allows to adapt the state and by that the model to the varying R-Q characteristic. For example, one can react to scene changes by just increasing the uncertainty of the current state. Note that in this case one can only rely on the predicted parameter mentioned in step 2.

It has been found out that it is more important to have small relative rather than small absolute errors. This is considered in the algorithm by using a logarithmic transformation. By that, an accurate model over the whole QP range results.

Due to the assumption that the bitrate used in step 3 is corrupted by white noise the model accuracy automatically adapts to the QP selection behavior of the rate control. That means if similar QPs are used the model will become locally accurate whereas if random QPs are used the model will become globally optimal.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Toby Berger. *Rate Distortion Theory (Prentice-Hall series in information and system sciences)*. Prentice Hall, 1971.

[2] Jr. Arthur E. Bryson and Yu-Chi Ho. *Applied Optimal Control: Optimization, Estimation and Control*. Ginn and Company, 1969.

[3] Bryson, A. E., Jr. and Henrikson, L. J. Estimation using sampled-data containing sequentially correlated noise. *Journal of Spacecraft and Rockets*, 5(6):662-665, 1967.

[4] Din-Yuen Chan and Shou-Jen Lin and Chun-Yuan Chang. A rate control scheme using Kalman filtering for H.263. *Journal of Visual Communication and Image Representation*, 16(6):734-748, 2005.

[5] Tihao Chiang and Ya-Qin Zhang. A new rate control scheme using quadratic rate distortion model. *IEEE Transactions on Circuits and Systems for Video Technology*, 7(1):246-250, 1997.

[6] Jianpeng Dong and Nam Ling. On Model Parameter Estimation for H.264/AVC Rate Control. *IEEE International Symposium on Circuits and Systems*: 289-292, 2007.

[7] Thomasz Grajek and Marek Doma n'ski. New Model of MPEG-4 AVC/H.264 Video Encoders. *International Conference on Image Processing*, pages 961-964, Honk Kong, 2010.

[8] Zhihai He and Mitra, S. K. ρ-domain bit allocation and rate control for real time video coding. *International Conference on Image Processing*, 3:546-549, 2001.

[9] Do-Kyoung Kwon and Mei-Yin Shen and Kuo, C.-C. J. Rate Control for H.264 Video With Enhanced Rate and Distortion Models. *IEEE Transactions on Circuits and Systems for Video Technology*, 17(5):517-529, 2007.

[10] Hung-Ju Lee and Tihao Chiang and Ya-Qin Zhang. Scalable rate control for MPEG-4 video. *IEEE Transactions on Circuits and Systems for Video Technology*, 10(6):878-894, 2000.

[11] Zhengguo Li and Feng Pan and Keng Pang Lim and Genan Feng and Xiao Lin and Susanto Rahardja. Adaptive Basic Unit Layer Rate Control for JVT. *Joint Video Team (JVT) of ISO/IEC MPEG & ITU-T VCEG*, 2003. JVT-G012.

[12] Ma, S. and Wen Gao and Yan Lu. Rate-distortion analysis for H.264/AVC video coding and its application to rate control. *IEEE Transactions on Circuits and Systems for Video Technology*, 15(12):1533-1544, 2005.

[13] Petovello, M. and OâKeefe, K. and Lachapelle, G. and Cannon, M. Consideration of time-correlated errors in a Kalman filter applicable to GNSS. *Journal of Geodesy*, 83:51-56, 2009.

[14] Rec. ITU-T H.264 and ISO/IEC 14496-10 (MPEG4-AVC). *Advanced video coding for generic audiovisual services*. 2010.

[15] Sermadevi, Y. and Hemami, S. S. and Masry, M. Convex Programming Formulations for Rate Allocation in Video Coding. *IEEE Transactions on Circuits and Systems for Video Technology*, 16(8):947-959, 2006.

[16] Simon, D. and Tien Li Chia. Kalman filtering with state equality constraints. *IEEE Transactions on Aerospace and Electronic Systems*, 38(1):128-136, 2002.

[17] Dan Simon. *Optimal State Estimation: Kalman, H Infinity, and Nonlinear Approaches*. Wiley-Interscience, 2006.

[18] Devinderjit Sivia and John Skilling. *Data Analysis: A Bayesian Tutorial*. Oxford University Press, USA, 2 edition, 2006.

[19] H. W. Sorenson. Least-squares estimation: from Gauss to Kalman. *IEEE Spectrum*, 7:63-68, 1970.

[20] Robert F. Stengel. *Optimal Control and Estimation (Dover Books on Advanced Mathematics)*. Dover Publications, 1994.

[21] Koichi Takagi and Yasuhiro Takishima and Yasuyuki Nakajima. A study on rate distortion optimization scheme for JVT coder. *Proc. SPIE*, 5150:914-923, 2003.

[22] Vetro, A. and Huifang Sun and Yao Wang. MPEG-4 rate control for multiple video objects. *IEEE Transactions on Circuits and Systems for Video Technology*, 9(1):186-199, 1999.

[23] Webb, J. L. H. and Oehler, K. A simple rate-distortion model, parameter estimation, and application to real-time rate control for DCT-based coders. *International Conference on Image Processing. Proceedings.*, 2:13-16, 1997.

[24] Yimin Zhou and Yu Sun and Zhidan Feng and Shixin Sun. New rate-distortion modeling and efficient rate control for H.264/AVC video coding. *Signal Processing: Image Communication*, 24(5):345-356, 2009.

The invention claimed is:

1. An apparatus for estimating model parameters of a rate- or distortion-quantization model function so as to approximate an actual rate- or distortion-quantization function of a video encoder for a frame sequence, comprising
   an updater configured to perform a prediction of a time-discrete Kalman filter, a state of which defines a parameter estimate for the model parameters to achieve a predicted state of the time-discrete Kalman filter for a current frame of the frame sequence from a state of the time-discrete Kalman filter for a previous frame of the frame sequence;
   a first corrector configured to determine a complexity measure of the current frame k, and perform a correction of the time-discrete Kalman filter using a measurement value which depends on the complexity measure determined so as to achieve a primarily corrected state of the time-discrete Kalman filter from the predicted state; and
   a second corrector configured to perform a correction of the time-discrete Kalman filter using a measurement value which depends on an actual coding rate or distortion of the video encoder in encoding the current frame using a predetermined quantization,
   wherein at least one of the updater, the first corrector and the second corrector comprises a hardware implementation.

2. The apparatus in accordance with claim 1, wherein the updater is configured to, in performing the prediction of the time-discrete Kalman filter, use an identity matrix as state transition matrix so that the predicted state adopts the parameter estimate defined by the state of the time-discrete Kalman filter for the previous frame and increase an uncertainty of the predicted state relative to the state of the time-discrete Kalman filter for the previous frame.

3. The apparatus according to claim 2, wherein the updater is configured to determine a similarity measure between the current frame and the previous frame and increase the uncertainty of the predicted state by an amount which depends on the similarity measure.

4. The apparatus according to claim 1, wherein the first corrector is configured to, in determining the complexity measure, determine a measure for a deviation between a provisionally predicted frame determined by motion compensated prediction, and the current frame and/or a measure for a dispersion of a spread of sample values of the current frame around a central tendency of the spread.

5. The apparatus according to claim 1, wherein the first corrector is configured to predict the model parameters of the rate- or distortion-quantization model function for the current frame based on the complexity measure determined, and to perform the correction using a measurement value depending on a difference between the predicted model parameters and a result of a prediction of the model parameters for the previous frame based on a complexity measure determined for the previous frame, applied to a correlation matrix, and a measurement matrix equal to the identity matrix minus the correlation matrix.

6. The apparatus according to claim 5, wherein the first corrector is configured to set the correlation matrix depending on a similarity between the current frame and the previous frame.

7. The apparatus in accordance with claim 1, wherein the second corrector is configured to perform the correction of the time-discrete Kalman filter using the measurement value using a measurement matrix which depends on a linear version of a linear relation between the model parameters and the coding rate or distortion in accordance with the rate- or distortion-quantization model function for the predetermined quantization, at the primarily corrected state.

8. The apparatus in accordance with claim 1, wherein the second corrector is configured to perform the correction of the time-discrete Kalman filter using the measurement value using a measurement matrix which depends on a linearized version of a relation between the model parameters and the coding rate or distortion in accordance with the rate- or distortion-quantization model function for the predetermined quantization, linearized at the primarily corrected state.

9. The apparatus according to claim 8, wherein the rate- or distortion-quantization model function is a rate-quantization model function and the first corrector is configured to predict the model parameters of the rate-quantization model function for the current frame k based on the complexity measure determined and to determine the measurement value for the correction depending on the predicted model parameters, and the second corrector is configured to determine the measurement matrix dependent on the linearized version of the relation between the model parameters and the coding rate in accordance with the rate-quantization model function, both such that the rate-quantization model function $f$ relating the quantization q by the video encoder to the coding rate of the video encoder is a piecewise function comprising a quadratic function piece within a finer quantization interval, and an exponential function piece within a coarser quantization interval.

10. The apparatus according to claim 8, wherein the first corrector is configured to predict the model parameters of the rate-quantization model function for the current frame k based on the complexity measure determined and to determine the measurement value for the correction depending on the predicted model parameters, and the second corrector is configured to determine the measurement matrix dependent on the linearized version of the relation between the model parameters and the coding rate in accordance with the rate-quantization model function, both such that the rate-quantization model function $f$ relating the quantization q by the video encoder to the coding rate of the video encoder is $$f(q, \beta) = \begin{cases} f_1(q, \beta), & 0 \le q \le m \\ f_2(q, \beta), & m \le q \le N \end{cases}$$

$$f_1(q,\beta)=a_1+b_1(q-m)+c_1(q-m)^2$$

$$f_2(q,\beta)=\exp(a_2+b_2(q-m)+c_2(q-m)^2)$$

with $\beta=[a_1, b_1, c_1, m, a_2, b_2, c_2]$, and N defining a range for quantization q so that $0 \le q \le N$, and $$x = \begin{bmatrix} x_1 \\ x_2 \\ x_3 \\ x_4 \\ x_5 \end{bmatrix} = \begin{bmatrix} \log(f(0, \beta)) \\ \log(f(m, \beta)) \\ f'(m, \beta)/f(m, \beta) \\ m \\ \log(f(N, \beta)) \end{bmatrix}$$

defines the model parameters $x_1$, $x_2$, $x_3$, $x_4$ and $x_5$.

11. The apparatus according to claim 1, wherein the updater is configured to, in performing the prediction, compute $$\hat{x}_k^- = \Phi_{k-1}\hat{x}_{k-1}^+$$

$$P_k^- = \Phi_{k-1}P_{k-1}^+\Phi_{k-1}^T + Q_{k-1}$$

where $\hat{x}_{k-1}^+$ is the state of the time-discrete Kalman filter for the previous frame k−1, $\hat{x}_k^-$ is the predicted state of the time-discrete Kalman filter for the current frame, $P_{k-1}^+$ is a covariance matrix measuring the uncertainty of the state of the time-discrete Kalman filter for the previous frame k−1, $P_k^-$ is a covariance matrix measuring the uncertainty of the predicted state of the time-discrete Kalman filter for the current frame, and $Q_{k-1}$ is a disturbance noise covariance matrix, wherein the first corrector is configured to set $Q_{k-1}$ depending on a similarity between the current frame and the previous frame, wherein the first corrector is configured to compute $$\hat{x}_k^0 = \hat{x}_k^- + K'_k(y'_k - H'_k\hat{x}_k^-)$$

$$P_k^0 = P_k^- - K'_k(H'_kP_k^- + M_k^T)$$

with $$y'_k = \tilde{x}_k - \psi_k\tilde{x}_{k-1}$$

$$H'_k = I - \psi_kI$$

$$K'_k = (P_k^-H_k^T + m_K)(H'_kP_k^-H_k^T + H'_kM_k + M_k^TH_k^T + V'_k)^{-1}$$

$$V'_k = \psi_kQ_{k-1}\psi_k^T + Z_kM_k = Q_{k-1}\psi_K^T$$

wherein $\hat{x}_k^0$ is s the primarily corrected state of the time-discrete Kalman filter for the current frame, $P_k^0$ is a covariance matrix measuring the uncertainty of the primarily corrected state, $\tilde{x}_k$ defines the model parameters as predicted from the determined complexity measure of the current frame k, $\tilde{x}_{k-1}$ defines the model parameters predicted from the determined complexity measure of the previous frame k−1, $\psi_k$ is a correlation matrix set depending on a similarity between the current frame and the previous frame, I is the identity matrix, $Z_k$ is a measurement noise covariance matrix, wherein the second corrector is configured to compute $$\hat{x}_k^+ = \hat{x}_k^0 + \tilde{K}_k(\tilde{y}_k - \log(f(q_k, \hat{x}_k^0)))$$

$$P_k^+ = (I - \tilde{K}_k \tilde{H}_k) P_k^0$$

with $$\tilde{H}_k = \left. \frac{\partial \log(f)}{\partial x} \right|_{q_k, \hat{x}_k^0}$$

$$\tilde{K}_k = P_k^0 \tilde{H}_k^T (\tilde{H}_k P_k^0 \tilde{H}_k^T + \tilde{V}_k)^{-1}$$

wherein $f$ is the rate- or distortion-quantization model function parametrizable by the model parameters x and representing coding-rate-or-distortion-to-quantization function $\hat{x}_k^+$ is a twice corrected state of the time-discrete Kalman filter for the current frame, $P_k^+$ is a covariance matrix measuring the uncertainty of the twice corrected state, $q_k$ is the predetermined quantization, $\tilde{V}_k$ is another measurement noise covariance matrix, and $\tilde{y}_k$ is a measure for the actual coding rate or distortion of the video encoder in encoding the current frame using the predetermined quantization.

12. The apparatus according to claim 1, wherein the second corrector is configured such that the measurement value depends on the actual coding rate or distortion of the video encoder in a manner dependent on a relationship between the predetermined quantization used in encoding the current frame and a further quantization used by the video encoder in encoding a previously encoded reference frame, from a reconstructed version of which the video encoder predicted the current frame within a motion compensated prediction in encoding the current frame.

13. The apparatus according to claim 1, wherein the apparatus is configured such that the frame sequence is a proper subset of a video sequence in that the frame sequence merely comprises frames of a specific prediction type and excludes frames of differing prediction type.

14. A system comprising
a video encoder; and
an apparatus for estimating model parameters of a rate- or distortion-quantization model function so as to approximate an actual rate- or distortion-quantization function of the video encoder for a frame sequence, said apparatus comprising
an updater configured to perform a prediction of a time-discrete Kalman filter, a state of which defines a parameter estimate for the model parameters to achieve a predicted state of the time-discrete Kalman filter for a current frame of the frame sequence from a state of the time-discrete Kalman filter for a previous frame of the frame sequence;
a first corrector configured to determine a complexity measure of the current frame k, and perform a correction of the time-discrete Kalman filter using a measurement value which depends on the complexity measure determined so as to achieve a primarily corrected state of the time-discrete Kalman filter from the predicted state; and
a second corrector configured to perform a correction of the time-discrete Kalman filter using a measurement value which depends on an actual coding rate or distortion of the video encoder in encoding the current frame using a predetermined quantization,
wherein at least one of the video encoder, the updater, the first corrector and the second corrector comprises a hardware implementation.

15. The system according to claim 14, further comprising a rate controller configured to use the rate- or distortion-quantization model function as determined by the primarily corrected state to determine the predetermined quantization and the video encoder is configured to encode the current frame into a data stream using the predetermined quantization.

16. The system according to claim 15, wherein the video encoder is configured to use motion-compensated prediction to predict the current frame at a first motion resolution to achieve the provisionally predicted frame, wherein the first corrector is configured to use the provisionally predicted frame to determine the complexity measure, and wherein the video encoder is configured to predict the current frame by motion-compensated prediction at a second motion resolution higher than the first motion resolution to achieve a final predicted frame and encode the current frame using the final predicted frame.

17. An apparatus for estimating model parameters of a rate-quantization model function so as to approximate an actual rate-quantization function of a video encoder for a frame sequence, wherein the apparatus is implemented as an electronic circuit configured, or a computer programmed, such that the rate-quantization model function is a piecewise function comprising a quadratic function piece within a finer quantization interval, and an exponential function piece within a coarser quantization interval.

18. The apparatus according to claim 17 wherein the apparatus is configured such that a location of a transition point between the quadratic function piece and the exponential function piece along a quantization axis is adjustable via the model parameters.

19. The apparatus according to claim 17 wherein the apparatus is configured to estimate the model parameters by use of an extended Kalman Filter the state of which defines a parameter estimate for the model parameters.

20. A method for estimating model parameters of a rate- or distortion-quantization model function so as to approximate an actual rate- or distortion-quantization function of a video encoder for a frame sequence, comprising
performing, by an updater, a prediction of a time-discrete Kalman filter, a state of which defines a parameter estimate for the model parameters to achieve a predicted state of the time-discrete Kalman filter for a current frame of the frame sequence from a state of the time-discrete Kalman filter for a previous frame of the frame sequence;
determining, by a first corrector, a complexity measure of the current frame k, and performing a correction of the time-discrete Kalman filter using a measurement value which depends on the complexity measure determined so as to achieve a primarily corrected state of the time-discrete Kalman filter from the predicted state; and
performing, by a second corrector, a correction of the time-discrete Kalman filter using a measurement value which depends on an actual coding rate or distortion of the video encoder in encoding the current frame using a predetermined quantization, and using a measurement matrix which depends on a linearized version of a relation between the model parameters and the coding rate or distortion in accordance with the rate- or distortion-quantization model function for the predetermined quantization, linearized at the primarily corrected state, wherein at least one of the updater, the first corrector and the second corrector comprises a hardware implementation.

21. A method for estimating model parameters of a rate-quantization model function so as to approximate an actual rate-quantization function of a video encoder for a frame sequence, wherein the rate-quantization model function is a piecewise function comprising a quadratic function piece within a finer quantization interval, and an exponential function piece within a coarser quantization interval, wherein the method is performed by an electronic circuit or a computer.

22. A non-transitory computer-readable medium including a computer program comprising a program code for performing, when running on a computer, a method for estimating model parameters of a rate- or distortion-quantization model function so as to approximate an actual rate- or distortion-quantization function of a video encoder for a frame sequence, the method comprising performing a prediction of a time-discrete Kalman filter, a state of which defines a parameter estimate for the model parameters to achieve a predicted state of the time-discrete Kalman filter for a current frame of the frame sequence from a state of the time-discrete Kalman filter for a previous frame of the frame sequence;

determining a complexity measure of the current frame k, and performing a correction of the time-discrete Kalman filter using a measurement value which depends on the complexity measure determined so as to achieve a primarily corrected state of the time-discrete Kalman filter from the predicted state; and performing a correction of the time-discrete Kalman filter using a measurement value which depends on an actual coding rate or distortion of the video encoder in encoding the current frame using a predetermined quantization, and using a measurement matrix which depends on a linearized version of a relation between the model parameters and the coding rate or distortion in accordance with the rate- or distortion-quantization model function for the predetermined quantization, linearized at the primarily corrected state.

23. A non-transitory computer-readable medium including a computer program comprising a program code for performing, when running on a computer, a method for estimating model parameters of a rate-quantization model function so as to approximate an actual rate-quantization function of a video encoder for a frame sequence, wherein the rate-quantization model function is a piecewise function comprising a quadratic function piece within a finer quantization interval, and an exponential function piece within a coarser quantization interval.

24. The system according to claim 15, wherein the video encoder is configured to store the data stream on a non-transitory digital storage medium, or to electronically output, at an electronic interface, the data stream.

25. The system according to claim 15, wherein the video encoder is configured to receive the frame sequence from a non-transitory digital storage medium or from a video camera.

26. The method according to claim 20, further comprising determining the predetermined quantization using the rate- or distortion-quantization model function as determined by the primarily corrected state, and encoding, performed by the video encoder, the current frame into a data stream using the predetermined quantization.

27. The method according to claim 26, wherein the method comprises storing, performed by the video encoder, the data stream on a non-transitory digital storage medium, or electronically outputting, performed by the video encoder, at an electronic interface, the data stream.

28. The system according to claim 26, wherein the method comprises receiving, performed by the video encoder, the frame sequence from a non-transitory digital storage medium or from a video camera.

29. A system comprising:

a video encoder; and an apparatus that estimates model parameters of a rate-quantization model function so as to approximate an actual rate-quantization function of a video encoder for a frame sequence, wherein the apparatus is configured such that the rate-quantization model function is a piecewise function comprising a quadratic function piece within a finer quantization interval, and an exponential function piece within a coarser quantization interval, wherein at least one of the video encoder and the apparatus comprises a hardware implementation.

30. The system according to claim 29, further comprising a rate controller configured to use the rate-quantization model function or a distortion-quantization model function to determine a quantization and the video encoder is configured to encode a current frame into a data stream using the quantization.

31. The system according to claim 30, wherein the video encoder is configured to store the data stream on a non-transitory digital storage medium, or to electronically output, at an electronic interface, the data stream.

32. The system according to claim 30, wherein the video encoder is configured to receive the frame sequence from a non-transitory digital storage medium or from a video camera.

33. The method according to claim 21, further comprising determining a quantization using the rate-quantization model function or a distortion-quantization model function, and encoding, performed by the video encoder, a current frame into a data stream using the quantization.

34. The method according to claim 33, wherein the method comprises storing, performed by the video encoder, the data stream on a non-transitory digital storage medium, or electronically outputting, performed by the video encoder, at an electronic interface, the data stream.

35. The system according to claim 33, wherein the method comprises receiving, performed by the video encoder, the frame sequence from a non-transitory digital storage medium or from a video camera.

* * * * *